US012315333B2

(12) United States Patent
Lyons et al.

(10) Patent No.: US 12,315,333 B2
(45) Date of Patent: May 27, 2025

(54) GAMING ENVIRONMENT TRACKING SYSTEM CALIBRATION

(71) Applicant: LNW Gaming, Inc., Las Vegas, NV (US)

(72) Inventors: Martin S. Lyons, Henderson, NV (US); Bryan Kelly, Rancho Santa Margarita, CA (US)

(73) Assignee: LNW Gaming, Inc., Las Vegas, NV (US)

( * ) Notice: Subject to any disclaimer, the term of this patent is extended or adjusted under 35 U.S.C. 154(b) by 51 days.

(21) Appl. No.: 17/945,165

(22) Filed: Sep. 15, 2022

(65) Prior Publication Data

US 2023/0005327 A1 Jan. 5, 2023

Related U.S. Application Data

(63) Continuation of application No. 17/319,904, filed on May 13, 2021, now Pat. No. 11,495,085.

(60) Provisional application No. 63/050,944, filed on Jul. 13, 2020.

(51) Int. Cl.
*G07F 17/32* (2006.01)

(52) U.S. Cl.
CPC ........ *G07F 17/3227* (2013.01); *G07F 17/322* (2013.01); *G07F 17/3223* (2013.01)

(58) Field of Classification Search
None
See application file for complete search history.

(56) References Cited

U.S. PATENT DOCUMENTS

| | | | |
|---|---|---|---|
| 5,103,081 | A | 4/1992 | Fisher et al. |
| 5,451,054 | A | 9/1995 | Orenstein |
| 5,757,876 | A | 5/1998 | Dam et al. |
| 6,460,848 | B1 | 10/2002 | Soltys et al. |
| 6,514,140 | B1 | 2/2003 | Storch |
| 6,517,435 | B2 | 2/2003 | Soltys et al. |
| 6,517,436 | B2 | 2/2003 | Soltys et al. |
| 6,520,857 | B2 | 2/2003 | Soltys et al. |
| 6,527,271 | B2 | 3/2003 | Soltys et al. |

(Continued)

FOREIGN PATENT DOCUMENTS

| | | | |
|---|---|---|---|
| CN | 111145259 | A | 5/2020 |
| KR | 1020160088224 | A | 7/2016 |

(Continued)

OTHER PUBLICATIONS

US 10,854,041 B2, 12/2020, Shigeta (withdrawn)

(Continued)

*Primary Examiner* — Ronald Laneau

(57) ABSTRACT

A method and apparatus to automatically modify one or more presentation attributes of a gaming system. For instance, the gaming system detects, via analysis of an image data by a neural network model, an appearance of one or more features of a gaming surface. The gaming system further automatically modifies, via the neural network model in response to detecting the appearance of the one or more features, a presentation attribute associated with presentation of gaming content via a designated area of the gaming surface. The gaming system further projects, via a projection system based on the modified presentation attribute, the gaming content onto the designated area of the gaming surface.

20 Claims, 17 Drawing Sheets

(56) References Cited

U.S. PATENT DOCUMENTS 6,530,836 B2 3/2003 Soltys et al.
6,530,837 B2 3/2003 Soltys et al.
6,533,276 B2 3/2003 Soltys et al.
6,533,662 B2 3/2003 Soltys et al.
6,579,180 B2 6/2003 Soltys et al.
6,579,181 B2 6/2003 Soltys et al.
6,595,857 B2 7/2003 Soltys et al.
6,663,490 B2 12/2003 Soltys et al.
6,688,979 B2 2/2004 Soltys et al.
6,712,696 B2 3/2004 Soltys et al.
6,758,751 B2 7/2004 Soltys et al.
7,011,309 B2 3/2006 Soltys et al.
7,124,947 B2 10/2006 Storch
7,316,615 B2 1/2008 Soltys et al.
7,753,781 B2 7/2010 Storch
7,771,272 B2 8/2010 Soltys et al.
8,130,097 B2 3/2012 Knust et al.
8,285,034 B2 10/2012 Rajaraman et al.
8,606,002 B2 12/2013 Rajaraman et al.
8,896,444 B1 11/2014 Knust et al.
9,165,420 B1 10/2015 Knust et al.
9,174,114 B1 11/2015 Knust et al.
9,378,605 B2 6/2016 Koyama
9,511,275 B1 12/2016 Knust et al.
9,795,870 B2 10/2017 Ratliff
9,811,735 B2 11/2017 Cosatto
9,889,371 B1 2/2018 Knust et al.
10,032,335 B2 7/2018 Shigeta
10,096,206 B2 10/2018 Bulzacki et al.
10,192,085 B2 1/2019 Shigeta
10,242,525 B1 3/2019 Knust et al.
10,242,527 B2 3/2019 Bulzacki et al.
10,304,191 B1 5/2019 Mousavian et al.
10,380,838 B2 8/2019 Bulzacki et al.
10,398,202 B2 9/2019 Shigeta
10,403,090 B2 9/2019 Shigeta
10,410,066 B2 9/2019 Bulzacki et al.
10,493,357 B2 12/2019 Shigeta
10,529,183 B2 1/2020 Shigeta
10,540,846 B2 1/2020 Shigeta
10,580,254 B2 3/2020 Shigeta
10,593,154 B2 3/2020 Shigeta
10,600,279 B2 3/2020 Shigeta
10,600,282 B2 3/2020 Shigeta
10,665,054 B2 5/2020 Shigeta
10,706,675 B2 7/2020 Shigeta
10,720,013 B2 7/2020 Main, Jr.
10,741,019 B2 8/2020 Shigeta
10,748,378 B2 8/2020 Shigeta
10,755,524 B2 8/2020 Shigeta
10,755,525 B2 8/2020 Shigeta
10,762,745 B2 9/2020 Shigeta
10,825,288 B1 11/2020 Knust et al.
10,832,517 B2 11/2020 Bulzacki et al.
10,846,980 B2 11/2020 French et al.
10,846,985 B2 11/2020 Shigeta
10,846,986 B2 11/2020 Shigeta
10,846,987 B2 11/2020 Shigeta
11,503,275 B2 11/2022 Kranski et al.
11,544,989 B1 * 1/2023 Seelig ................. G07F 17/3211
2004/0085451 A1 5/2004 Chang
2005/0059479 A1 3/2005 Soltys et al.
2006/0019739 A1 1/2006 Soltys et al.
2011/0115158 A1 5/2011 Gagner et al.
2011/0230248 A1 9/2011 Baerlocher et al.
2013/0001008 A1 1/2013 Corona et al.
2014/0357361 A1 12/2014 Rajaraman
2015/0199872 A1 7/2015 George et al.
2016/0089594 A1 3/2016 Yee
2016/0103176 A1 4/2016 Zeise et al.
2018/0040190 A1 2/2018 Keilwert et al.
2018/0053377 A1 2/2018 Shigeta
2018/0061178 A1 3/2018 Shigeta
2018/0068525 A1 3/2018 Shigeta
2018/0075698 A1 3/2018 Shigeta
2018/0114406 A1 4/2018 Shigeta
2018/0211110 A1 7/2018 Shigeta
2018/0211472 A1 7/2018 Shigeta
2018/0232987 A1 8/2018 Shigeta
2018/0239984 A1 8/2018 Shigeta
2018/0336757 A1 11/2018 Shigeta
2019/0043309 A1 2/2019 Shigeta
2019/0088082 A1 3/2019 Shigeta
2019/0102987 A1 4/2019 Shigeta
2019/0147689 A1 5/2019 Shigeta
2019/0172312 A1 6/2019 Shigeta
2019/0188957 A1 6/2019 Bulzacki et al.
2019/0188958 A1 6/2019 Shigeta
2019/0236891 A1 8/2019 Shigeta
2019/0259238 A1 8/2019 Shigeta
2019/0266832 A1 8/2019 Shigeta
2019/0318576 A1 10/2019 Shigeta
2019/0320768 A1 10/2019 Shigeta
2019/0333322 A1 10/2019 Shigeta
2019/0333323 A1 10/2019 Shigeta
2019/0333326 A1 10/2019 Shigeta
2019/0340873 A1 11/2019 Shigeta
2019/0344157 A1 11/2019 Shigeta
2019/0347893 A1 11/2019 Shigeta
2019/0347894 A1 11/2019 Shigeta
2019/0362594 A1 11/2019 Shigeta
2019/0371112 A1 12/2019 Shigeta
2019/0392680 A1 12/2019 Shigeta
2020/0034629 A1 1/2020 Vo et al.
2020/0035060 A1 1/2020 Shigeta
2020/0065618 A1 2/2020 Zhang
2020/0118390 A1 4/2020 Shigeta
2020/0122018 A1 4/2020 Shigeta
2020/0175806 A1 6/2020 Shigeta
2020/0202134 A1 6/2020 Bulzacki et al.
2020/0226878 A1 7/2020 Shigeta
2020/0234464 A1 7/2020 Shigeta
2020/0242888 A1 7/2020 Shigeta
2020/0258351 A1 8/2020 Shigeta
2020/0265672 A1 8/2020 Shigeta
2020/0273289 A1 8/2020 Shigeta
2020/0294346 A1 9/2020 Shigeta
2020/0302168 A1 9/2020 Vo et al.
2020/0342281 A1 10/2020 Shigeta
2020/0349806 A1 11/2020 Shigeta
2020/0349807 A1 11/2020 Shigeta
2020/0349808 A1 11/2020 Shigeta
2020/0349809 A1 11/2020 Shigeta
2020/0349810 A1 11/2020 Shigeta
2020/0349811 A1 11/2020 Shigeta
2020/0364979 A1 11/2020 Shigeta
2020/0372746 A1 11/2020 Shigeta
2020/0372752 A1 11/2020 Shigeta
2022/0327886 A1 * 10/2022 Mathur ................. G06T 19/006
2022/0383698 A1 * 12/2022 Lyons ................. G07F 17/3241
2024/0013617 A1 * 1/2024 Arbogast ............ G07F 17/3241

FOREIGN PATENT DOCUMENTS

WO 2009062153 A1 5/2009
WO 2021104153 A1 6/2021

OTHER PUBLICATIONS

China National Intellectual Property Administration, "First Office Action," Application No. 2021107764872, Jul. 4, 2024, 16 pages (Chinese Version).
China National Intellectual Property Administration, "First Office Action," Application No. 2021107764872, Jul. 4, 2024, 16 pages (English Version).

* cited by examiner

GAMING ENVIRONMENT TRACKING SYSTEM CALIBRATION

CROSS-REFERENCE TO RELATED APPLICATION

This application is a continuation of U.S. patent application Ser. No. 17/319,904, filed May 13, 2021, which claims the priority benefit of U.S. Provisional Patent Application No. 63/050,944 filed Jul. 13, 2020, which Ser. No. 17/319,904 application and 63/050,944 application are each incorporated by reference herein in their respective entireties.

COPYRIGHT

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever. Copyright 2022 LNW Gaming, Inc.

FIELD OF THE INVENTION

The present invention relates generally to gaming systems, apparatus, and methods and, more particularly, to image analysis and tracking of physical objects in a gaming environment.

BACKGROUND

Casino gaming environments are dynamic environments in which people, such as players, casino patrons, casino staff, etc., take actions that affect the state of the gaming environment, the state of players, etc. For example, a player may use one or more physical tokens to place wagers on the wagering game. A player may perform hand gestures to perform gaming actions and/or to communicate instructions during a game, such as making gestures to hit, stand, fold, etc. Further, a player may move physical cards, dice, gaming props, etc. A multitude of other actions and events may occur at any given time. To effectively manage such a dynamic environment, the casino operators may employ one or more tracking systems or techniques to monitor aspects of the casino gaming environment, such as credit balance, player account information, player movements, game play events, and the like. The tracking systems may generate a historical record of these monitored aspects to enable the casino operators to facilitate, for example, a secure gaming environment, enhanced game features, and/or enhanced player features (e.g., rewards and benefits to known players with a player account).

Some gaming systems can perform object tracking in a gaming environment. For example, a gaming system with a camera can capture an image feed of a gaming area to identify certain physical objects or to detect certain activities such as betting actions, payouts, player actions, etc.

Some gaming systems also incorporate projectors. For example, a gaming system with a camera and a projector can use the camera to capture images of a gaming area to electronically analyze to detect objects/activities in the gaming area. The gaming system can further use the projector to project related content into the gaming area. A gaming system that can perform object tracking and related projections of content can provide many benefits, such as better customer service, greater security, improved game features, faster game play, and so forth.

However, one challenge to such a gaming system is coordinating the complexity of the system elements. For example, a camera may take a picture of a gaming table from one perspective (i.e., from the perspective of the camera lens) while a projector projects images from a different perspective (i.e., from the perspective of the projector lens). Neither of those perspectives can be aligned with each other perfectly because the camera and projector are separate devices. To add to the complexity, the camera and projector may need to be positioned in a way that is not directly facing the surface of the gaming table. Thus, the camera perspective and the projector perspective are not orthogonal to the plane of the surface, and thus are unaligned with the projection surface. To further add to this challenge, sometimes, in a busy gaming environment, casino patrons, casino staff, or others may move a camera or a projector (whether purposefully or accidentally), thus altering relative perspectives. If the camera and projector are used for tracking gaming activities at a gaming table, the camera and projector would need to be reconfigured to each other be able to return to precise and reliable service.

Accordingly, a new tracking system that is adaptable to the challenges of dynamic casino gaming environments is desired.

SUMMARY

According to one aspect of the present disclosure, a gaming system is provided for automatically modifying one or more presentation attributes of a gaming system. For instance, the gaming system detects, via analysis of an image data by a neural network model, an appearance of one or more features of a gaming surface. The gaming system further automatically modifies, via the neural network model in response to detecting the appearance of the one or more features, a presentation attribute associated with presentation of gaming content via a designated area of the gaming surface. The gaming system further projects, via a projection system based on the modified presentation attribute, the gaming content onto the designated area of the gaming surface.

Additional aspects of the invention will be apparent to those of ordinary skill in the art in view of the detailed description of various embodiments, which is made with reference to the drawings, a brief description of which is provided below.

Figure 1:
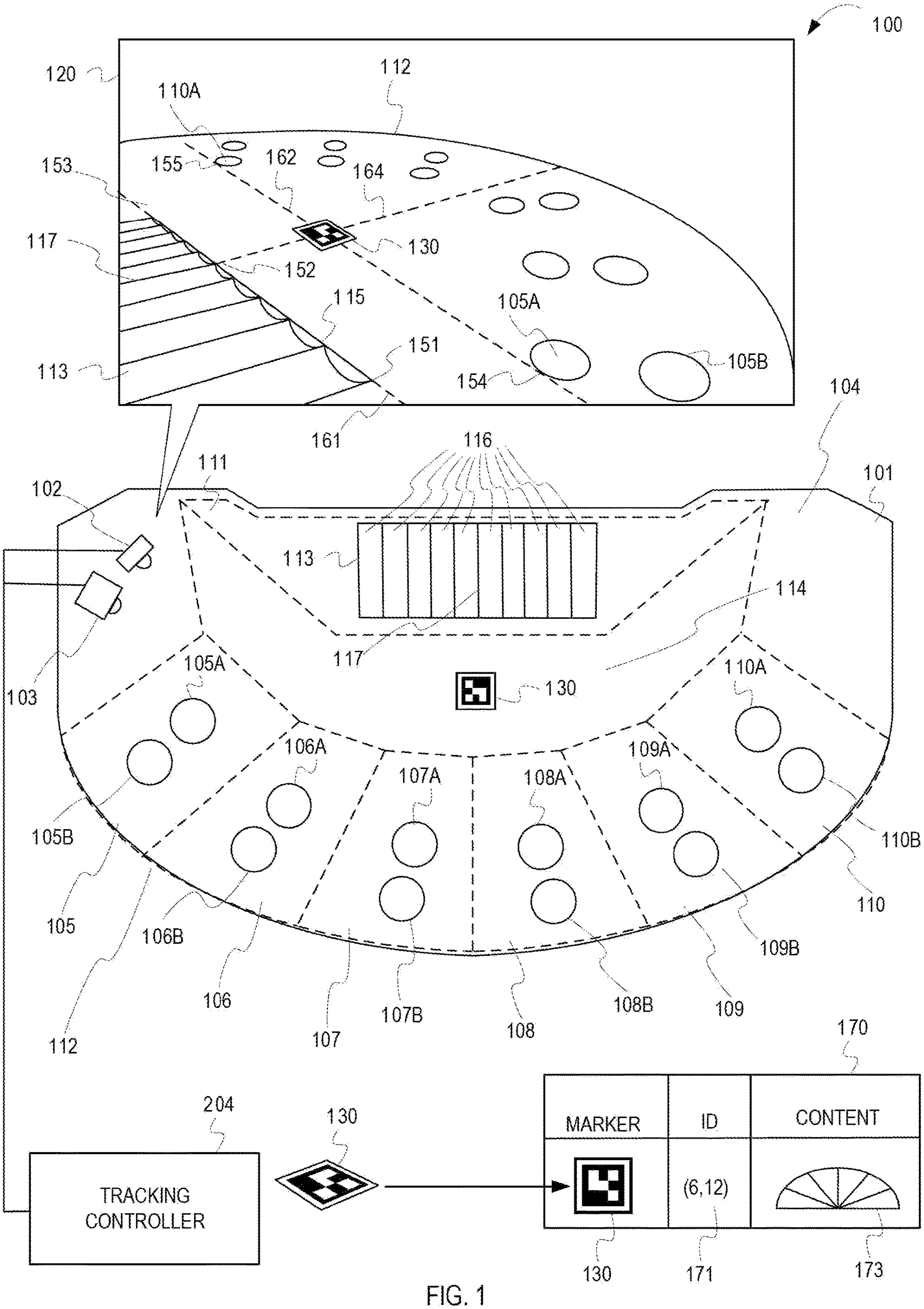
FIG. 1 is a diagram of an example gaming system according to one or more embodiments of the present disclosure.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DETAILED DESCRIPTION

While this invention is susceptible of embodiment in many different forms, there is shown in the drawings, and will herein be described in detail, preferred embodiments of the invention with the understanding that the present disclosure is to be considered as an exemplification of the principles of the invention and is not intended to limit the broad aspect of the invention to the embodiments illustrated. For purposes of the present detailed description, the singular includes the plural and vice versa (unless specifically disclaimed); the words “and” and “or” shall be both conjunctive and disjunctive; the word “all” means “any and all”; the word “any” means “any and all”; and the word “including” means “including without limitation.”

For purposes of the present detailed description, the terms “wagering game,” “casino wagering game,” “gambling,” “slot game,” “casino game,” and the like include games in which a player places at risk a sum of money or other representation of value, whether or not redeemable for cash, on an event with an uncertain outcome, including without limitation those having some element of skill. In some embodiments, the wagering game involves wagers of real money, as found with typical land-based or online casino games. In other embodiments, the wagering game additionally, or alternatively, involves wagers of non-cash values, such as virtual currency, and therefore may be considered a social or casual game, such as would be typically available on a social networking web site, other web sites, across computer networks, or applications on mobile devices (e.g., phones, tablets, etc.). When provided in a social or casual game format, the wagering game may closely resemble a traditional casino game, or it may take another form that more closely resembles other types of social/casual games.

Some embodiments described herein facilitate electronically detecting one or more objects within a gaming area, such as objects on a surface of a gaming table, and calibrating an attribute of the system accordingly. In some instances, a gaming system may capture image data of a gaming table and an associated environment around the gaming table, including an image of a surface of the gaming table. The gaming system can further analyze the captured image data (e.g., using one or more imaging neural networks models and/or other imaging analysis tools) to identify one or more locations in the captured image data that depict one or more specific points of interest related to physical objects (e.g., marker(s)). The systems and methods can further associate the one or more locations with identifier value(s), which can be used as a reference to automatically calibrate any attributes of the system associated with performance of one or more gaming features. The one or more gaming features may include, but are not limited to, a gaming mode, a gaming operation, a gaming function, gaming content selection, gaming content placement/orientation, gaming animation, sensor/camera settings, projector settings, virtual scene aspects, etc. In some instances, the gaming system can project, at the gaming table surface, one or more markers, such as a board or grid of markers, and can determine the identifier value(s) based on electronic analysis of one or more images of the markers (e.g., via transformation(s) between camera perspective and virtual scene perspective, via incremental image property modification, etc.). In some instances, the gaming system can analyze the image(s) by decoding information (e.g., symbols, codes, etc.) presented on a marker. In some examples, the identifier value(s) are stored in memory as coordinate locations in relation to locations in a grid structure. In some examples, the gaming system automatically calibrates the system attribute(s) based on the identifier values. For instance, in some embodiments, the gaming system calibrates the presentation (e.g., placement, orientation, etc.) of gaming content, such as by generating a virtual mesh using detected center points of the markers for polygonal triangulation, and orienting placement of content in a virtual scene relative to the detected center points. Furthermore, in some instances the gaming system can deduce, based on the electronic analysis, a perceived function, purpose, location, appearance, orientation, etc. of the marker and, based on the deduction, calibrate an aspect of the gaming system.

A self-referential gaming table system for automatic calibration (as disclosed herein) is a significant advancement in gaming technology. It resolves many of the challenges of a gaming system by coordinating the complexity of the perspectives and interactivity of a camera, a projector, and a dynamic gaming environment. It permits a camera and/or a projector to be positioned in a way that is not directly facing the surface of a gaming table (e.g., positioned non-orthogonally to a plane of the surface), yet have content be aligned (e.g., orthogonally) to the projection surface. Proper alignment of gaming content ensures that projections of gaming animations clearly indicate a gaming outcome, thus reducing the chance of any disputes between patrons and casino operators regarding the outcome. Furthermore, the gaming system can calibrate itself rapidly and reliably, for instance, if the camera and/or a projector is moved or if a gaming table surface is changed (e.g., if a surface covering is replaced due to wear, if surface objects are rearranged for different game purposes, etc.). Fast and accurate self-calibration permits a gaming table to function precisely and stay in service more reliably, without the need for highly trained technicians.

FIG. 1 is a diagram of an example gaming system 100 according to one or more embodiments of the present disclosure. The gaming system 100 includes a gaming table 101, a camera 102 and a projector 103. The camera 102 captures a stream of images of a gaming area, such as an area encompassing a top surface 104 of the gaming table 101. The stream comprises a frame of image data (e.g., image 120). The projector 103 is configured to project images of gaming content. The projector 103 projects the images of the gaming content toward the surface 104 relative to objects in the gaming area. The camera 102 is positioned above the surface 104 and to the left of a first player area 105. The camera 102 has a first perspective (e.g., field of view or angle of view) of the gaming area. The first perspective may be referred to in this disclosure more succinctly as a camera perspective or viewing perspective. For example, the camera 102 has a lens that is pointed at the gaming table 101 in a way that views portions of the surface 104 relevant to game play and that views game participants (e.g., players, dealer, back-betting patrons, etc.) positioned around the gaming table 101. The projector 103 is also positioned above the gaming table 101, and also to the left of the first player area 105. The projector 103 has a second perspective (e.g., projection direction, projection angle, projection view, or projection cone) of the gaming area. The second perspective may be referred to in this disclosure more succinctly as a projection perspective. For example, the projector 103 has a lens that is pointed at the gaming table 101 in a way that projects (or throws) images of gaming content onto substantially similar portions of the gaming area that the camera 102 views. Because the lenses for the camera 102 and the projector 103 are not in the same location, the camera perspective is different from the projection perspective. The gaming system 100, however, is a self-referential gaming table system that adjusts for the difference in perspectives. For instance, the gaming system 100 is configured to detect, in response to electronic analysis of the image 120, one or more points of interest that are substantially planar with the surface of a gaming table 101. The gaming system 100 can further automatically transform locations values for the detected point(s) from the camera perspective to the projection perspective, and vice versa, such that they substantially, and accurately, correspond to each other. Furthermore, the gaming system 100 can, based on the transforming, automatically calibrate one or more attributes of the gaming table 101, the camera 102, the projector 103, or any other aspect of the gaming system 100. For instance, the gaming system can automatically calibrate gaming modes, game operations, gaming functions, game-related features, gaming content placement/orientation, sensor/camera settings, projector settings, virtual scene aspects, etc. As an example, gaming system 100 can associate a set of points of interest with one or more locations for a target area for observation by the neural network model of one or more events related to a game aspect. In some instances, the gaming system 100 associates the location with a target area for projection of wagering game content related to the game aspect (e.g., related to a game mode). For example, in some embodiments, the gaming system 100 automatically associates one or more locations of the one or more objects in the image with one or more identifier values associated with a point of interest on the surface 104. In some instances, the object 130 has visibly detectable information, such as a visible code associated with a unique identifier value. In some examples, the gaming system 100 determines an identifier 171 related to the object 130 (e.g., coordinate values related to a grid structure for the object 130, a key linking the object 130 to content 173 via a database 170, etc.). The gaming system 100 can use the identifier value to configure a gaming aspect associated with the point of interest. For instance, the gaming system 100 can use the identifier value to orient, size, and position the content 173 relative to a location and/or orientation of the object 130 on the gaming table 101 (e.g. configure a position and/or orientation of wagering game content for a game mode associated with the point of interest).

In some embodiments, the gaming system 100 automatically detects physical objects as points of interest based on electronic analysis of the image 120, such as via feature set extraction, object classification, etc. performed by a neural network model (e.g., via tracking controller 204). For example, the gaming system 100 can detect one or more points of interest by detecting, via a neural network model, physical features of the image 120 that appear to be co-planar with the surface 104. For example, the gaming system 100 includes a tracking controller 204 (described in more detail in FIG. 2). The tracking controller 204 is configured to monitor the gaming area (e.g., physical objects within the gaming area), and determine a relationship between one or more of the objects. The tracking controller 204 can further receive and analyze collected sensor data (e.g., receives and analyzes the captured image data from the camera 102) to detect and monitor physical objects. The tracking controller 204 can establish data structures relating to various physical objects detected in the image data. For example, the tracking controller 204 can apply one or more image neural network models during image analysis that are trained to detect aspects of physical objects. In at least some embodiments, each model applied by the tracking controller 204 may be configured to identify a particular aspect of the image data and provide different outputs for any physical objected identified such that the tracking controller 204 may aggregate the outputs of the neural network models together to identify physical objects as described herein. The tracking controller 204 may generate data objects for each physical object identified within the captured image data. The data objects may include identifiers that uniquely identify the physical objects such that the data stored within the data objects is tied to the physical objects. The tracking controller 204 can further store data in a database, such as database system 208 in FIG. 2, or, as shown in FIG. 1, in database 170.

In some embodiments, the gaming system 100 automatically detects an automorphing relationship (e.g., a homography or isomorphism relationship) between observed points of interest to transform between projection spaces and linear spaces. For instance, the gaming system 100 can detect points of interest that are physically on the surface 104 and deduce a spatial relationship between the points of interest. For instance, the gaming system 100, can detect one or more physical objects resting, printed, or otherwise physically positioned on the surface 104, such as objects placed at specific locations on the surface 104 in a certain pattern, or for a specific purpose. In some instances, the tracking controller 204 determines, via electronic analysis, features of the objects, such as their shapes, visual patterns, sizes, relative locations, numbers, displayed identifiers, etc. In some instances, the gaming system 100 can detect at least three points of interest, substantially planar with the surface 104, which have a known homography relationship (e.g., a triangle, a parallelogram, etc.). Thus, the gaming system 100 can use an isomorphic or homography transformation on the detected objects, such as a linear transformation, an affine transformation, a projection transformation, a barycentric transformation, etc.

In some embodiments, the gaming system 100 deduces a relationship (e.g., a spatial relationship) for a plurality of objects (e.g., representing a plurality of related points) on the surface of the gaming table based on classifications of detected objects (particularly, objects or features for automorphism opportunities, such as objects that, by their determined features, are objects that have rigid transformation relationships, affine transformation relationships, or projective transformation relationships). For instance, the gaming system 100 can detect a unique configuration of objects on the surface 104, such as a logo for a manufacturer of a gaming table, a number of printed bet spots on a fabric that covers a gaming table, dimensions of a chip tray 113, etc. For example, the gaming system 100 may detect, within the captured image, a logo (not shown) that identifies Scientific Games Inc. as the game manufacturer of the gaming table 101 or of the covering for the surface 104. The gaming system 100 may further identify a set of ellipses in the captured image and deduce that they are betting circles. For instance, as shown in FIG. 1, there are twelve bet spots with betting circles (e.g., main betting circles 105A, 106A, 107A, 108A, 109A, and 110A ("105A-110A") and secondary betting circles 105B, 106B, 107B, 108B, 109B, and 110B ("105B-110B")). Based on that information, the gaming system may look up a library of gaming table layouts of a detected manufacturer and obtain, in response to detecting the configuration, a template that has precise distances and positions of printed features on a gaming surface fabric, such as a fabric that has the given number of detected bet spots arranged in an arc shape. Thus the positions and orientations of the printed objects have a known relationship in a geometric plane (i.e., of the surface 104) that occurs when the fabric is placed and affixed to the top of the gaming table (such as when a gaming fabric top is placed or replaced within the casino (e.g., for initial setup, when it becomes soiled or damaged, etc.)). Thus, the gaming system 100 detects and identifies the printed features and uses them as identifiers due to their shape and pattern which relates to a known relationship in spatial dimensions and in purpose (e.g., different bet circles represent different points of interest on the plane of the gaming surface, each with a different label and function during the wagering game).

As mentioned, one example of objects associated with points of interest include printed betting circles (e.g., main betting circles 105A, 106A, 107A, 108A, 109A, and 110A ("105A-110A") and secondary betting circles 105B, 106B, 107B, 108B, 109B, and 110B ("105B-110B"). The printed betting circles are related to six different player areas 105, 106, 107, 108, 109, and 110 are arranged symmetrically around a dealer area 111. For example, main betting circle 105A and secondary betting circle 105B are associated with the first player area 105 at a far left end of a rounded table edge 112; main betting circle 106A and 106B are associated with the second player area 106 situated to the right of the first player area 105; and so forth for additional player areas 107-110 around the gaming table 101 until reaching an opposing far right end of the rounded table edge 112 (i.e., main betting circle 107A and secondary betting circle 107B are associated with the third player area 107, main betting circle 108A and secondary betting circle 108B are associated with the fourth player area 108, main betting circle 109A and secondary betting circle 109B are associated with the fifth player area 109, and main betting circle 110A and secondary betting circle 110B are associated with the sixth player area 110). In some instances, the gaming system 100 detects, or in some instances estimates, a centroid for any of detected objects/points of interest (e.g., the gaming system 100 can estimate centroids for the chip tray 113 and/or for the betting circles 105A0-11A and 105B-110B). In some instances, the gaming system 100 can detect, or estimate, the centroid of each of the ellipses in the image 120 by binarizing the digitalized image of the ellipse (e.g. converting the pixels of the image of the ellipse from an 8-bit grayscale image to a 1-bit black and white image) and determining the centroid by using a weighted average of image pixel intensities. The gaming system 100 can use the centroids of the ellipses as references points.

In some instances, the gaming system 100 can automatically detect, as points of interest, native topological features of the surface 104. For instance, the gaming system 100 can detect one or more points of interest associated with the chip tray 113 positioned at the dealer area 111. The chip tray 113 can hold gaming tokens, such as gaming chips, tiles, etc., which a dealer can use to exchange a player's money for physical gaming tokens. Some objects may be included at the gaming table 101, such as gaming tokens, cards, a card shoe, dice, etc. but are not shown in FIG. 1 for simplicity of description. An additional area 114 is available for presenting (e.g., projecting) gaming content relevant to some elements of a wagering game that are common, or related, to any or all participants. In some instances, the gaming system 100 utilizes any additional identified features (e.g., a center of the chip tray 113), gathering as much information as possible to deduce a proper layout relationship for the content.

In one example, the gaming system 100 detects the chip tray 113 based on its visible features (e.g., its rectangular shape, its parallel lines of evenly spaced slats 116, its position relative to the shape of the table 101, etc.). For example, the gaming system 100 detects a first upper corner point 151 and a second upper corner point 153 of the chip tray 113. The gaming system 100 also determines a center point 152 on a line 161 that follows an upper edge 115 of the chip tray 113. The gaming system 100 can determine the center point 152 by detecting the number of slats 116 within the chip tray 113 (e.g., the chip tray 113 has ten evenly spaced slats 116), detecting a center divider 117 for a central slat, and detecting a top point of the center divider that connects with the upper edge 115 (i.e., the center point 152). The gaming system 100 can utilize the center point 152 (as well as the orientation of the center divider 117) as a references to construct a center dividing line 164 (also referred to herein as an axis of symmetry for a layout of the surface 104 of the gaming table 101). Furthermore, the gaming system 100 detects the features of the betting circles 105A-110A and 105B-110B. For instance, the gaming system 100 detects a number of ellipses that appear in the image 120 as the betting circles 105A-110A and 105B-110B. The gaming system 100 can also detect the ellipses relative sizes, their arrangement relative to the chip tray 113, their locations relative to each other, etc. The gaming system 100 can thus deduce that the center dividing line 164 is an axis of symmetry for a layout of the table, and that each of the ellipses seen are actually circles having equivalent sizes to each other. In some instances, the gaming system 100 is configured to determine, based on the electronic analysis, that a homography relationship exists between two circles on the same geometric plane. More specifically, a line 162 can be determined between two intersecting perimeter points of the ellipses, such as the point 154 on the perimeter of the betting circle 105A and point 155 on the perimeter of the betting circle 110A. Because of the nature of the homography relationship, and the detected orientation of the betting circles 105A and 110A relative to the chip tray 113, the gaming system 100 determines that the line 162 is parallel to the line 161. Furthermore, the gaming system 100 can access information about the required presentation parameters for the content 173. For instance, the gaming system 100 accesses layout information about the content 173 stored in the database 170 and determines that a centroid of the content 173 is supposed to be anchored in section 114 half-way between the betting circle 105A and betting circle 110A. Therefore, using all of the acquired information (including the detected homography relationships), the gaming system 100 determines that an intersection of the center dividing line 164 and the line 162 is an anchor point for the centroid of the content 173. In some instances, the gaming system 100 can further position the object 130 (e.g., automatically move it) until it is aligned with the intersection. The gaming system 100 can store the location values and orientation values of the object 130 as calibration values, thus ensuring automatic positioning and orientation of the content 173 when projected into the area 114 during game play.

As mentioned, in some instances, the gaming system 100 can automatically detect one or more points of interest that are projected onto the surface 104 by the projector 103. In one example, the gaming system 100 can automatically triangulate a projection space based on known spatial relationships of points of interest on the surface 104. For example, in some embodiments, the gaming system 100 utilizes polygon triangulation of the detected points of interest to generate a virtual mesh associated with a virtual scene modeled to the projection perspective. More specifically, the gaming system 100 can project images of a set of one or more specific objects or markers (as points of interest) onto the surface 104 and use the marker(s) for self-reference and auto-calibration. For example, the gaming system 100 may project the object 130 at the surface 104. The object 130 has an appearance that is uniquely identifiable when analyzed, electronically, from any viewing angle. Throwing a projected image of the object 130 into the gaming area will cause the object 130 to naturally appear on the surface 104 because the photons of light for the projected object 103 only become visible (thus detectable by gaming system 100), when they appear on the reflective material of the surface 104. As such, the surface 104 should be covered with a material that adequately reflects the light that is projected at its surface by the projector 103. Thus, in some instances, the gaming system 100 determines that projected objects are planar with the surface of the gaming table 103 when it identifies, via the neural network model, the features of the projected objects with sufficient confidence that it is a projected object used for calibration. In some instances, the object 130 has an isomorphic shape, or in other words, the shape of the object 130 can be isomorphically transformed (e.g., via a homography matrix) to a known reference shape(s) (e.g., a square, a parallelogram, a triangle, a set of planar circles, etc.). Thus, the gaming system 100, using the isomorphic quality of the object 130, transforms the appearance of the object 130 until it is recognizable as a point of reference for calibration. The object 130 may be referred to herein as a fiducial, or a fiducial marker. In other words, the gaming system 100 can place the object 130 in the field of view of the camera 102 as a point of reference or a measure for calibration of the gaming system 100. The object 130 also has contrasting color/tone features that the gaming system 100 uses to binarize and identify the object 130 (e.g., the object 130 is projected in black and white to cause the appearance of the object 130 have a high contrast between its light and dark elements, thus improving detectability via binarization). Because the object 130 has a unique shape, with isometric properties, the gaming system 100 can determine an orientation of the object 130 within the image 120 and, in response, orient the placement of the content 173 accordingly. For instance, in the database 170, the marker 130 has a specific orientation. The content 173 also has a specific orientation indicated by the database 170. The gaming system 100 can thus replace the object 130 with the content 173 using their related orientations indicated by the database 170. The gaming system 100 can further observe a projected appearance of the content 173 (after it has been initially positioned), and can automatically make any additional adjustments necessary to its size, shape, location, etc. and/or can present (e.g., project) calibration features to make any additional adjustments to the appearance of the content 173.

In some examples, the gaming system 100 detects a combination of non-projected objects (e.g., objects physically placed or positioned on the gaming table 101) and projected objects (e.g., objects thrown via light projection onto the surface 104). For example, the gaming system 100 detects when an object(s) is/are placed at a specific location(s) on the surface 104 during a setup procedure. The gaming system 100 stores the location(s) of object(s) relative to each other (e.g., as multiple objects captured in a single image or as a composition of multiple images of the same object that is positioned at different locations during the setup). The gaming system 100 detects the location(s) of the object(s) as the area of interest on a virtual scene that overlays the image 120. The gaming system 100 can further present calibration options for manual mapping the placement of gaming content within the virtual scene, so that the positioning of the content corresponds to the detected location(s).

As mentioned, the gaming system 100 using a variety of points of interest including topological features and a fiducial object (e.g., object 130). In some embodiments, the gaming system 100 projects a set of fiducial objects, similar to object 130, each having a unique individual appearance that relates (e.g., via a binary code) to an identifier value (e.g., see FIG. 3 for more detail). The identifier value identifies the individual object (or "marker") within a spatial relationship of the set of objects as a group, such as a grid relationship arranged as a board pattern, where a location of each marker on the board is a different identifier/coordinate point in the grid. In some embodiments, the board is an isomorphic shape (e.g., a parallelogram or a square) and/or has some identifiable homography quality, such as a known symmetry, a known geometric relationship of at least three points in a single plane, etc. Thus the gaming system 100 can transform, via a projection transformation, an appearance of the markers from the projection space visible in the image 120 to a known linear (e.g., Euclidean) space associated with the grid, such as a virtual, or augmented reality layer depicting a virtual scene with gaming content mapped relative to locations in the grid. In some instances, the board is a set of binary square fiducial markers (e.g., barcode markers, aruco markers). In some examples, a square fiducial comprises a black square box (set against a white background) with a unique image or pattern inside of the black box (e.g., see object 130). The pattern can be used to uniquely identify the fiducial and determine its orientation. Binary fiducials can be generated in sets, with each member of the set having a binary-coded image, from a Bose- Chaudhuri-Hocquenghem (BCH) code generator, thus generating sets of patterns with error-correcting capability. In some embodiments, the gaming system 100 uses a board having binary square fiducial markers positioned in each intersection of a grid structure. In some embodiments, the set of markers are placed on a checkboard, with the markers positioned on the alternating light-colored (e.g., white) squares. The shape and position of the dark-colored (e.g., black) squares in alternating contrast to the light-colored squares provides a detectable feature that the gaming system 100 can utilize to precisely find the corners of the markers.

Furthermore, in some instances, (e.g., see FIG. 3 for more detail) the gaming system 100 includes a feature to analyze the image 120 in stages via an incremental thresholding process, thus ensuring electronic identification of a set of objects within the image 120 despite darkened and inconsistent lighting conditions within a gaming environment that affect the quality of the image 120. Specifically, gaming system 100 may not be able to adjust the lighting of the gaming environment in which the gaming table 101 exists. As a result, when the camera 102 captures the image 120, the size of the gaming table 101, and the various distances of each point of interest to the camera 102, causes the digitized pixels of the image 120 to have pixel intensity values that can vary in actual values based on their relative location on the surface 104. For example, sections of the gaming table 101 that are close to the camera 102 may have brighter pixel intensity values than sections of the gaming table 101 that are far from the camera 102. In another example, lighting conditions at one end of the gaming table 101 may be different from lighting conditions at another rend of the gaming table 101. Consequently, when the gaming system 100 electronically analyzes the image 120, pixel intensity values for the different sections of the table can vary widely. As a result, binarization of the image 120 with a single thresholding value would cause the gaming system 100 to detect features of depicted objects in one section of the image 120 but not in other sections. To overcome this challenge, the gaming system 100 performs an incremental thresholding of the image 120 during binarization. For example, the gaming system 100 increases the threshold value of the image 120 incrementally, and gradually, from a range of selected values (e.g., from a low threshold value to a high threshold value (or vice versa)), causing features of individual sections of the image 120 to increase in value incrementally across the range of possible values. After each progressive incrementing of the thresholding value, the gaming system 100 electronically analyzes the image 120 again to detect additional possible points of interest in sections having similar pixel intensity values (based on their relative locations in the image 120, based on the lighting conditions at the different sections, etc.). Thus, when the thresholding value increments across the range, object features across the entire gaming table 101 become visually detectable in the image 120 by the neural network model and, thus, extractable and classifiable.

Figure 2:
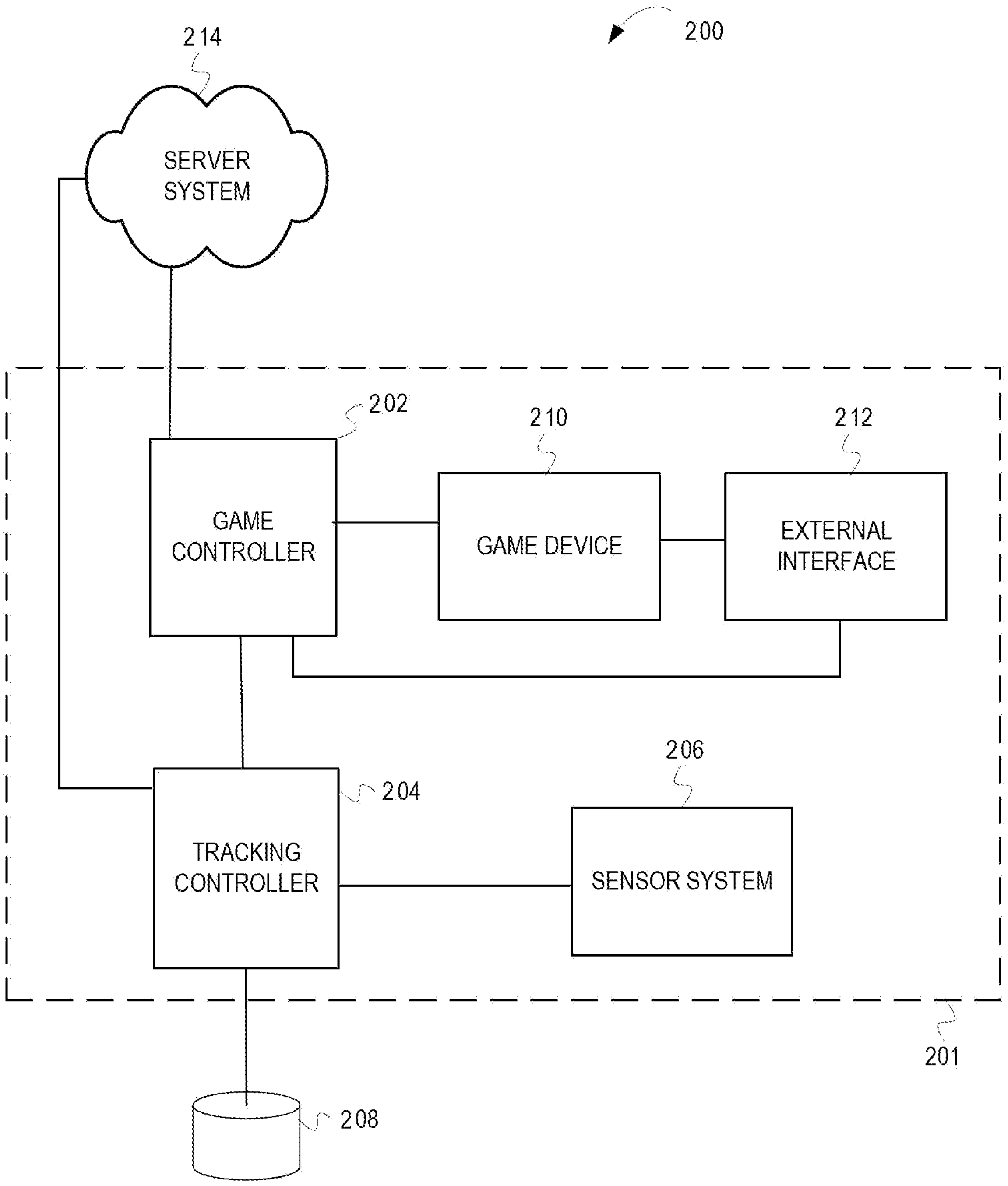
FIG. 2 is a diagram of an exemplary gaming system according to one or more embodiments of the present disclosure.

FIG. 2 is a block diagram of an example gaming system 200 for tracking aspects of a wagering game in a gaming area 201. In the example embodiment, the gaming system 200 includes a game controller 202, a tracking controller 204, a sensor system 206, and a tracking database system 208. In other embodiments, the gaming system 200 may include additional, fewer, or alternative components, including those described elsewhere herein.

The gaming area 201 is an environment in which one or more casino wagering games are provided. In the example embodiment, the gaming area 201 is a casino gaming table and the area surrounding the table (e.g., as in FIG. 1A-1D). In other embodiments, other suitable gaming areas 201 may be monitored by the gaming system 200. For example, the gaming area 201 may include one or more floor-standing electronic gaming machines. In another example, multiple gaming tables may be monitored by the gaming system 200. Although the description herein may reference a gaming area (such as gaming area 201) to be a single gaming table and the area surrounding the gaming table, it is to be understood that other gaming areas 201 may be used with the gaming system 200 by employing the same, similar, and/or adapted details as described herein.

The game controller 202 is configured to facilitate, monitor, manage, and/or control gameplay of the one or more games at the gaming area 201. More specifically, the game controller 202 is communicatively coupled to at least one or more of the tracking controller 204, the sensor system 206, the tracking database system 208, a gaming device 210, an external interface 212, and/or a server system 214 to receive, generate, and transmit data relating to the games, the players, and/or the gaming area 201. The game controller 202 may include one or more processors, memory devices, and communication devices to perform the functionality described herein. More specifically, the memory devices store computer-readable instructions that, when executed by the processors, cause the game controller 202 to function as described herein, including communicating with the devices of the gaming system 200 via the communication device(s).

The game controller 202 may be physically located at the gaming area 201 as shown in FIG. 2 or remotely located from the gaming area 201. In certain embodiments, the game controller 202 may be a distributed computing system. That is, several devices may operate together to provide the functionality of the game controller 202. In such embodiments, at least some of the devices (or their functionality) described in FIG. 2 may be incorporated within the distributed game controller 202.

The gaming device 210 is configured to facilitate one or more aspects of a game. For example, for card-based games, the gaming device 210 may be a card shuffler, shoe, or other card-handling device. The external interface 212 is a device that presents information to a player, dealer, or other user and may accept user input to be provided to the game controller 202. In some embodiments, the external interface 212 may be a remote computing device in communication with the game controller 202, such as a player's mobile device. In other examples, the gaming device 210 and/or external interface 212 includes one or more projectors. The server system 214 is configured to provide one or more backend services and/or gameplay services to the game controller 202. For example, the server system 214 may include accounting services to monitor wagers, payouts, and jackpots for the gaming area 201. In another example, the server system 214 is configured to control gameplay by sending gameplay instructions or outcomes to the game controller 202. It is to be understood that the devices described above in communication with the game controller 202 are for exemplary purposes only, and that additional, fewer, or alternative devices may communicate with the game controller 202, including those described elsewhere herein.

In the example embodiment, the tracking controller 204 is in communication with the game controller 202. In other embodiments, the tracking controller 204 is integrated with the game controller 202 such that the game controller 202 provides the functionality of the tracking controller 204 as described herein. Like the game controller 202, the tracking controller 204 may be a single device or a distributed computing system. In one example, the tracking controller 204 may be at least partially located remotely from the gaming area 201. That is, the tracking controller 204 may receive data from one or more devices located at the gaming area 201 (e.g., the game controller 202 and/or the sensor system 206), analyze the received data, and/or transmit data back based on the analysis.

In the example embodiment, the tracking controller 204, similar to the example game controller 202, includes one or more processors, a memory device, and at least one communication device. The memory device is configured to store computer-executable instructions that, when executed by the processor(s), cause the tracking controller 204 to perform the functionality of the tracking controller 204 described herein. The communication device is configured to communicate with external devices and systems using any suitable communication protocols to enable the tracking controller 204 to interact with the external devices and integrates the functionality of the tracking controller 204 with the functionality of the external devices. The tracking controller 204 may include several communication devices to facilitate communication with a variety of external devices using different communication protocols.

The tracking controller 204 is configured to monitor at least one or more aspects of the gaming area 201. In the example embodiment, the tracking controller 204 is configured to monitor physical objects within the area 201, and determine a relationship between one or more of the objects. Some objects may include gaming tokens. The tokens may be any physical object (or set of physical objects) used to place wagers. As used herein, the term "stack" refers to one or more gaming tokens physically grouped together. For circular tokens typically found in casino gaming environments (e.g., gaming chips), these may be grouped together into a vertical stack. In another example in which the tokens are monetary bills and coins, a group of bills and coins may be considered a "stack" based on the physical contact of the group with each other and other factors as described herein.

In the example embodiment, the tracking controller 204 is communicatively coupled to the sensor system 206 to monitor the gaming area 201. More specifically, the sensor system 206 includes one or more sensors configured to collect sensor data associated with the gaming area 201, and the tracking controller 204 receives and analyzes the collected sensor data to detect and monitor physical objects. The sensor system 206 may include any suitable number, type, and/or configuration of sensors to provide sensor data to the game controller 202, the tracking controller 204, and/or another device that may benefit from the sensor data.

In the example embodiment, the sensor system 206 includes at least one image sensor that is oriented to capture image data of physical objects in the gaming area 201. In one example, the sensor system 206 may include a single image sensor that monitors the gaming area 201. In another example, the sensor system 206 includes a plurality of image sensors that monitor subdivisions of the gaming area 201. The image sensor may be part of a camera unit of the sensor system 206 or a three-dimensional (3D) camera unit in which the image sensor, in combination with other image sensors and/or other types of sensors, may collect depth data related to the image data, which may be used to distinguish between objects within the image data. The image data is transmitted to the tracking controller 204 for analysis as described herein. In some embodiments, the image sensor is configured to transmit the image data with limited image processing or analysis such that the tracking controller 204 and/or another device receiving the image data performs the image processing and analysis. In other embodiments, the image sensor may perform at least some preliminary image processing and/or analysis prior to transmitting the image data. In such embodiments, the image sensor may be considered an extension of the tracking controller 204, and as such, functionality described herein related to image processing and analysis that is performed by the tracking controller 204 may be performed by the image sensor (or a dedicated computing device of the image sensor). In certain embodiments, the sensor system 206 may include, in addition to or instead of the image sensor, one or more sensors configured to detect objects, such as time-of-flight sensors, radar sensors (e.g., LIDAR), thermographic sensors, and the like.

The tracking controller 204 is configured to establish data structures relating to various physical objects detected in the image data from the image sensor. For example, the tracking controller 204 applies one or more image neural network models during image analysis that are trained to detect aspects of physical objects. Neural network models are analysis tools that classify "raw" or unclassified input data without requiring user input. That is, in the case of the raw image data captured by the image sensor, the neural network models may be used to translate patterns within the image data to data object representations of, for example, tokens, faces, hands, etc., thereby facilitating data storage and analysis of objects detected in the image data as described herein.

At a simplified level, neural network models are a set of node functions that have a respective weight applied to each function. The node functions and the respective weights are configured to receive some form of raw input data (e.g., image data), establish patterns within the raw input data, and generate outputs based on the established patterns. The weights are applied to the node functions to facilitate refinement of the model to recognize certain patterns (i.e., increased weight is given to node functions resulting in correct outputs), and/or to adapt to new patterns. For example, a neural network model may be configured to receive input data, detect patterns in the image data representing human body parts, perform image segmentation, and generate an output that classifies one or more portions of the image data as representative of segments of a player's body parts (e.g., a box having coordinates relative to the image data that encapsulates a face, an arm, a hand, etc. and classifies the encapsulated area as a "human," "face," "arm," "hand," etc.).

For instance, to train a neural network to identify the most relevant guesses for identifying a human body part, for example, a predetermined dataset of raw image data including image data of human body parts, and with known outputs, is provided to the neural network. As each node function is applied to the raw input of a known output, an error correction analysis is performed such that node functions that result in outputs near or matching the known output may be given an increased weight while node functions having a significant error may be given a decreased weight. In the example of identifying a human face, node functions that consistently recognize image patterns of facial features (e.g., nose, eyes, mouth, etc.) may be given additional weight. Similarly, in the example of identifying a human hand, node functions that consistently recognize image patterns of hand features (e.g., wrist, fingers, palm, etc.) may be given additional weight. The outputs of the node functions (including the respective weights) are then evaluated in combination to provide an output such as a data structure representing a human face. Training may be repeated to further refine the pattern-recognition of the model, and the model may still be refined during deployment (i.e., raw input without a known data output).

At least some of the neural network models applied by the tracking controller 204 may be deep neural network (DNN) models. DNN models include at least three layers of node functions linked together to break the complexity of image analysis into a series of steps of increasing abstraction from the original image data. For example, for a DNN model trained to detect human faces from an image, a first layer may be trained to identify groups of pixels that represent the boundary of facial features, a second layer may be trained to identify the facial features as a whole based on the identified boundaries, and a third layer may be trained to determine whether or not the identified facial features form a face and distinguish the face from other faces. The multi-layered nature of the DNN models may facilitate more targeted weights, a reduced number of node functions, and/or pipeline processing of the image data (e.g., for a three-layered DNN model, each stage of the model may process three frames of image data in parallel).

In at least some embodiments, each model applied by the tracking controller 204 may be configured to identify a particular aspect of the image data and provide different outputs such that the tracking controller 204 may aggregate the outputs of the neural network models together to identify physical objects as described herein. For example, one model may be trained to identify human faces, while another model may be trained to identify the bodies of players. In such an example, the tracking controller 204 may link together a face of a player to a body of the player by analyzing the outputs of the two models. In other embodiments, a single DNN model may be applied to perform the functionality of several models.

As described in further detail below, the tracking controller 204 may generate data objects for each physical object identified within the captured image data by the DNN models. The data objects are data structures that are generated to link together data associated with corresponding physical objects. For example, the outputs of several DNN models associated with a player may be linked together as part of a player data object.

It is to be understood that the underlying data storage of the data objects may vary in accordance with the computing environment of the memory device or devices that store the data object. That is, factors such as programming language and file system may vary the where and/or how the data object is stored (e.g., via a single block allocation of data storage, via distributed storage with pointers linking the data together, etc.). In addition, some data objects may be stored across several different memory devices or databases.

In some embodiments, the player data objects include a player identifier, and data objects of other physical objects include other identifiers. The identifiers uniquely identify the physical objects such that the data stored within the data objects is tied to the physical objects. In some embodiments, the identifiers may be incorporated into other systems or subsystems. For example, a player account system may store player identifiers as part of player accounts, which may be used to provide benefits, rewards, and the like to players. In certain embodiments, the identifiers may be provided to the tracking controller 204 by other systems that may have already generated the identifiers.

In at least some embodiments, the data objects and identifiers may be stored by the tracking database system 208. The tracking database system 208 includes one or more data storage devices (e.g., one or more databases) that store data from at least the tracking controller 204 in a structured, addressable manner. That is, the tracking database system 208 stores data according to one or more linked metadata fields that identify the type of data stored and can be used to group stored data together across several metadata fields. The stored data is addressable such that stored data within the tracking database system 208 may be tracked after initial storage for retrieval, deletion, and/or subsequent data manipulation (e.g., editing or moving the data). The tracking database system 208 may be formatted according to one or more suitable file system structures (e.g., FAT, exFAT, ext4, NTFS, etc.).

The tracking database system 208 may be a distributed system (i.e., the data storage devices are distributed to a plurality of computing devices) or a single device system. In certain embodiments, the tracking database system 208 may be integrated with one or more computing devices configured to provide other functionality to the gaming system 200 and/or other gaming systems. For example, the tracking database system 208 may be integrated with the tracking controller 204 or the server system 214.

In the example embodiment, the tracking database system 208 is configured to facilitate a lookup function on the stored data for the tracking controller 204. The lookup function compares input data provided by the tracking controller 204 to the data stored within the tracking database system 208 to identify any "matching" data. It is to be understood that "matching" within the context of the lookup function may refer to the input data being the same, substantially similar, or linked to stored data in the tracking database system 208. For example, if the input data is an image of a player's face, the lookup function may be performed to compare the input data to a set of stored images of historical players to determine whether or not the player captured in the input data is a returning player. In this example, one or more image comparison techniques may be used to identify any "matching" image stored by the tracking database system 208. For example, key visual markers for distinguishing the player may be extracted from the input data and compared to similar key visual markers of the stored data. If the same or substantially similar visual markers are found within the tracking database system 208, the matching stored image may be retrieved. In addition to or instead of the matching image, other data linked to the matching stored image may be retrieved during the lookup function, such as a player account number, the player's name, etc. In at least some embodiments, the tracking database system 208 includes at least one computing device that is configured to perform the lookup function. In other embodiments, the lookup function is performed by a device in communication with the tracking database system 208 (e.g., the tracking controller 204) or a device in which the tracking database system 208 is integrated within.

Figure 3:
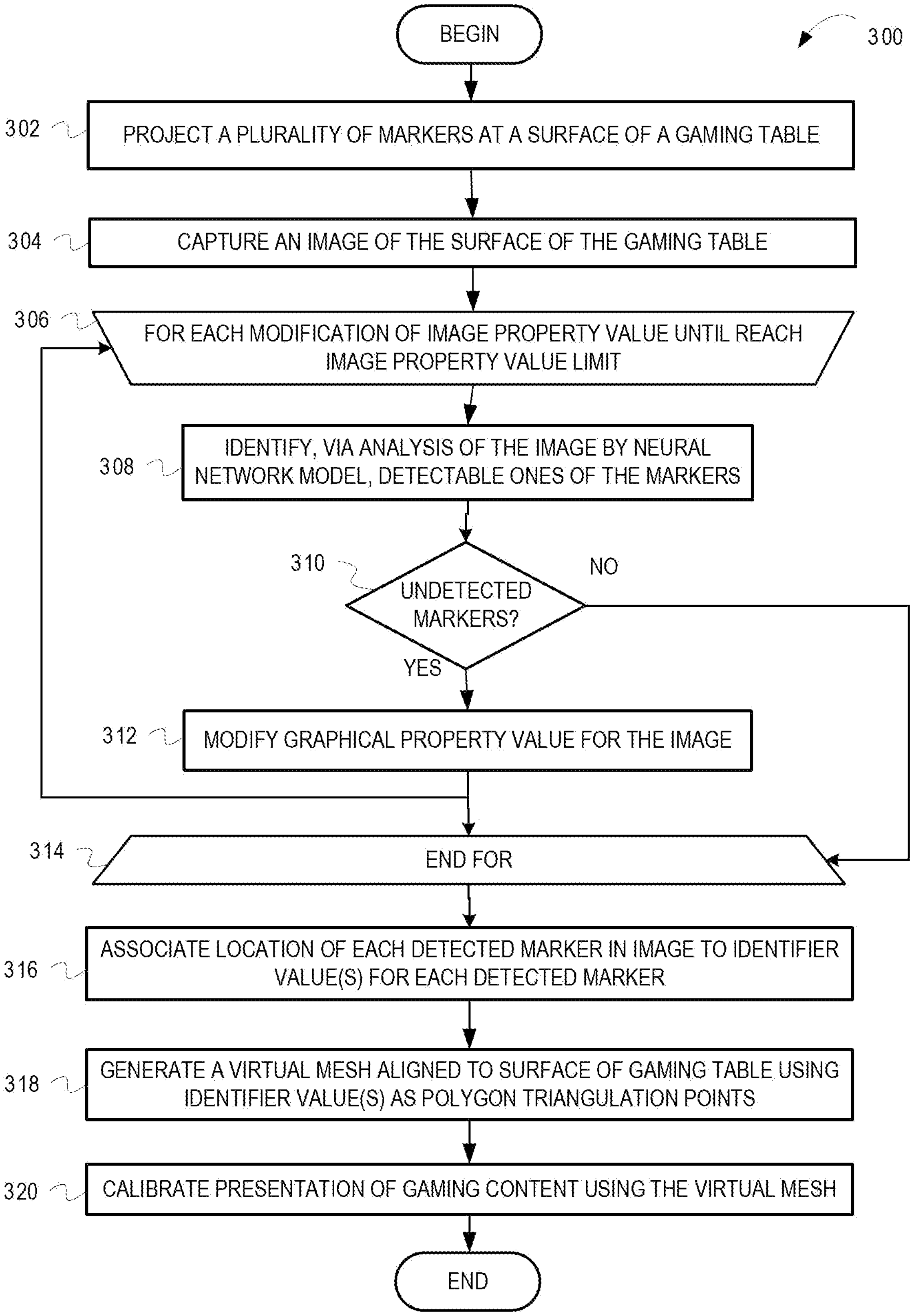
FIG. 3 is a flow diagram of an example method according to one or more embodiments of the present disclosure.

FIG. 3 is a flow diagram of an example method according to one or more embodiments of the present disclosure. FIGS. 4, 5A, 5B, 5C, 6, 7, 8A, 8B, 9A and 9B are diagrams of an exemplary gaming system associated with the data flow shown in FIG. 3 according to one or more embodiments of the present disclosure. FIG. FIGS. 4, 5A, 5B, 5C, 6, 7, 8A, 8B, 9A and 9B will be referenced in the description of FIG. 3.

Figure 4:
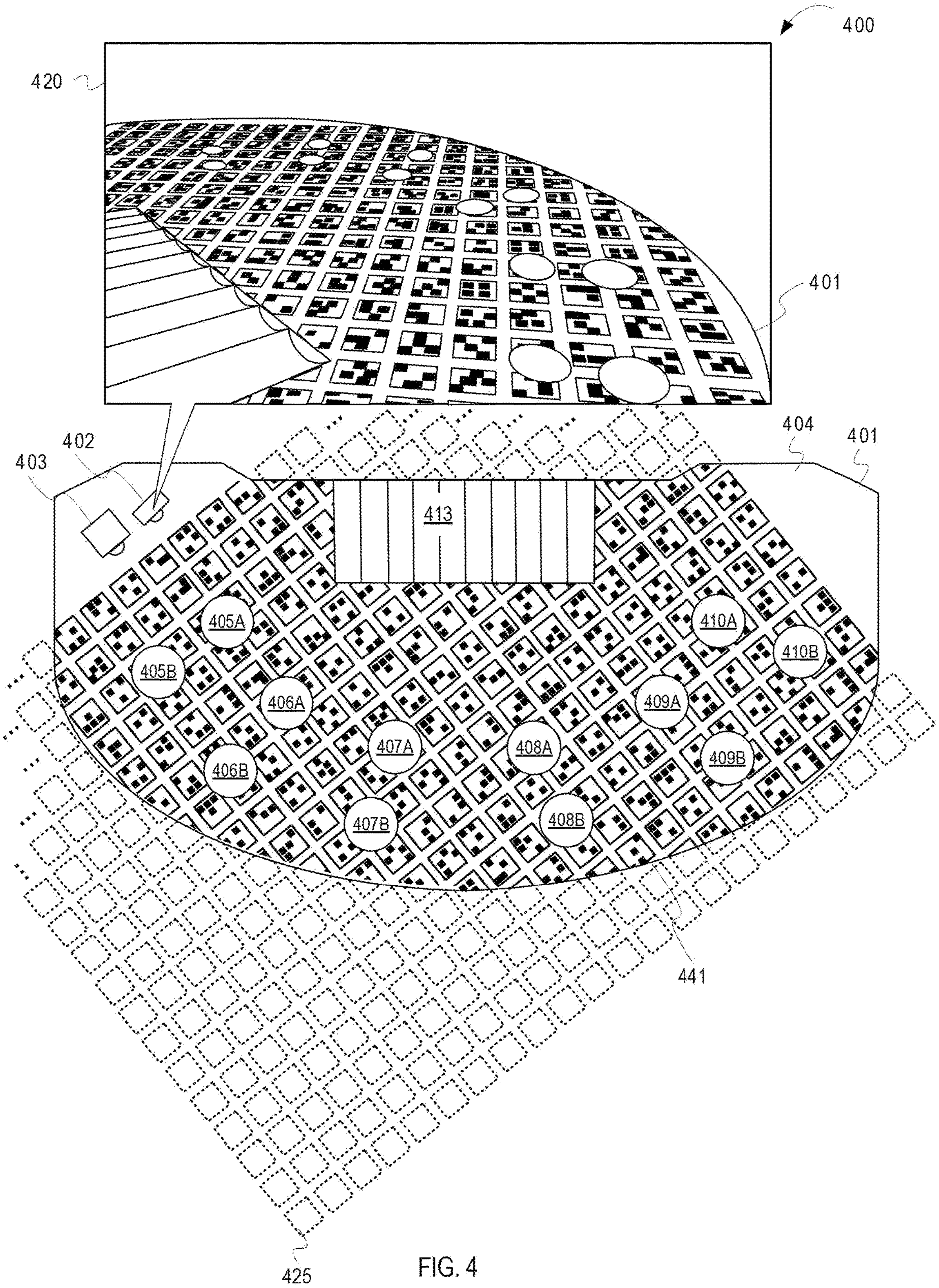
FIGS. 4, 5A, 5B, 5C, 6, 7, 8A, 8B, 9A and 9B are diagrams of an exemplary gaming system associated with the data flow shown in FIG. 3 according to one or more embodiments of the present disclosure.

In FIG. 3, a flow 300 begins at processing block 302 with projecting a plurality of markers at a surface of a gaming table. In one example, as in FIG. 4, a gaming system 400 is similar to gaming system 100. The gaming system 400 includes a gaming table 401, a camera 402, a projector 403, a chip tray 413, main betting circles 405A-410A, and secondary betting circles 405B-410B. The gaming system 400 is further similar to the gaming system 200 described in FIG. 2 and, as such, may utilize the tracking controller 204 to perform one or more operations described. In FIG. 4, the gaming system 400 projects (via projector 403) a board of coded square fiducial markers ("board 425"). A portion of the markers become visible to the camera 402 when projected onto a surface 404 of the gaming table 401. A portion of the markers that do not land on the surface 404 (when thrown by the projector 403) are not visible to the camera 402. The markers that are visible are depicted in the image 420 taken by the camera 402. In some embodiments, the board 425 is configured to be larger than the surface 404 of the gaming table 401. Thus, when the board 420 is projected into the gaming area at the general direction of the gaming table 401, at least some portion of the board 425 appears on the surface 404, ensuring adequate coverage of the gaming table 401 with markers. At some point, if the projector 403 is moved, the gaming system 400 can recapture the image 420. Because the projector 403 had been moved, different markers from the board 425 would fall on different parts of the surface 404. However, because the markers are organized into a common grid structure, and because each marker is proportionately spaced, the gaming system 400 can recapture the image 420 and re-calibrate (e.g., repeat one or more portions of the flow 300), using the new fiducial marker identifier values that correspond to the different markers that fall on the different parts of the surface 404. Thus, the board 425 becomes a floating grid, any part of which can be moored to any part of the surface 404, and thus provides a margin of acceptable shift in the physical location of the projector 403 for calibration purposes.

The number of markers in the board 425 can vary. More markers represent more grid points that can be used as more interior points of a convex hull during polygon triangulation (e.g., at processing block 318), thus producing a denser virtual mesh. A denser virtual mesh has more points for calibrating the presentation of gaming content (e.g., at processing block 320). Thus, according to some embodiments, more markers in the board 425 is preferable so long as the markers are of sufficient size to be recognizable to the neural network model (given the input requirement of the neural network model, the distance of the camera 402 to the gaming table 401, the lighting in the gaming area, etc.). At the very least the board 425 should include enough markers to cover the portions of the gaming table 401 that need to be observed for object detection and/or for accurate position of content projection. In some instances, a grid can include any plurality of markers, such as two or more. In some embodiments, the markers are in a known spatial relationship to each other in distance and orientation according to a uniform grid structure. Consequently, if the gaming system 400 detects locations for some of the markers, the gaming system 400 can extrapolate locations of obscured markers based on the known spatial relationship of all markers to each other via the grid structure for the board 425. For example, as shown in FIG. 4, some of the markers projected at the surface 404 may be obscured by, or may be non-viewable due to a presence of, one or more additional objects on the surface 404, such as the betting circles 405A-410A and 405B-410B. However, the gaming system 400 can detect other visible markers around the betting circles 405A-410A and 405B-410B. After detecting the markers that surround the betting circles 405A-410A and 405B-410B, the gaming system 400 can extrapolate location values for the obscured markers. For instance, each of the visible markers has a unique identifier value that represents a coordinate in the organized grid. The gaming system 400 knows dimensions for spacing of the coordinate points in the grid. Thus, the gaming system 400 can extrapolate the locations of the obscured markers relative to the locations of the surrounding visible markers using the known dimensions for the spacing of the coordinate points relative to each other in the grid.

Referring back to FIG. 3, the flow 300 continues at processing block 304 with capturing an image of the surface of the gaming table. For example, as shown in FIG. 4, the system 400 can capture, from a perspective of the camera 402 ("camera perspective") the image 420 of the gaming area, which includes an image of the gaming table 401. In one embodiment, the gaming system 400 captures a single frame of a video stream of image data by the camera 402 and sends the single frame of image data (e.g., image 420) to a tracking controller (e.g., tracking controller 204 shown in FIG. 2) for image processing and analysis to identify physical objects in the gaming area. As mentioned previously, the portion of the markers on the board 425 that land on the surface 404 become visible to the camera 402 and, thus, are visible in the image 420 taken by the camera 402.

Figure 5A:
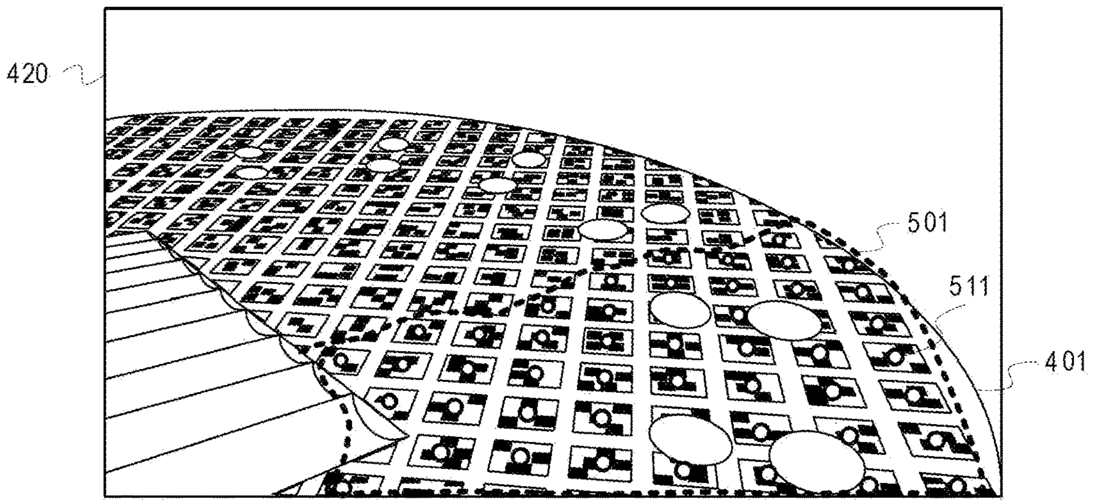

Referring back to FIG. 3, the flow 300 continues at processing block 306 with a looping, or repeating, operation that iteratively modifies an image property value of the captured image until reaching an image property value limit. In some instances a gaming system modifies graphical properties of the image, such as resolution, contrast, brightness, color, vibrancy, sharpness, threshold, exposure, etc. As those properties are modified incrementally (either alone or in different combinations), additional information becomes visible in the image. In one example, as shown in FIG. 5A, the gaming system 400 performs a threshold algorithm to the entire image 420. The threshold algorithm sets an initial threshold value. The threshold value is a pixel intensity value. In other words, any pixel in the image 420 having a pixel intensity above the pixel intensity threshold value will appear as white in the modified image, whereas any pixel having a pixel intensity below the pixel intensity threshold value will appear as black. For example, the gaming system 400 sets a threshold value to a low setting, such as the number "32." This means that any pixel with an intensity level lower than "32" will appear as black, and anything with a higher intensity level will appear as white. Consequently, as shown in FIG. 5A, a first section 501 of the set of visible markers on the table 401 becomes detectable (i.e., first marker set 511).

The flow 300 continues at processing block 308 with identifying, via analysis of the image by neural network model, detectable ones of the markers. For example, as shown in FIG. 5A, the gaming system 400 auto-morphs, via a neural network model, each object within the image 420 having detectable features. Because of the initial threshold value (e.g., the lower value of "32"), section 501 includes objects (e.g., the first set of markers 511) with pixel intensity values that cause a digitized version of the first set of markers 511 to become sufficiently binary for identification (e.g., the light pixels of the first set of markers 511 change to a pixel intensity value corresponding to the color white and the dark pixels of the first set of markers 511 change to a pixel intensity value correspond to the color black). The gaming system 400 transforms each of the first set of markers 511 shown in the image 420 via an isomorphic transformation (e.g., a projection transformation) until it is in detectable as a marker. The gaming system 400 can thus identify the unique pattern (e.g., a coded value) of each detected marker to determine a unique identifier value assigned to the marker (e.g., a coordinate value corresponding to a location of the marker in the grid structure of the board 425). The gaming system 400 can further perform a centroid detection algorithm on the detected marker to indicate a center point of the square shape of the detected marker. The center point of the square shape becomes a location reference point to which the gaming system 400 can associate the identifier for the detected marker.

The flow 300 continues at processing block 310 with determining whether there are any undetected markers. If there are still undetected markers, the gaming system continues to processing block 312. If, however, all possible markers that are detectable on the surface of the gaming table have been detected, the loop ends 314 and the process continues at processing block 316.

Figure 5B:
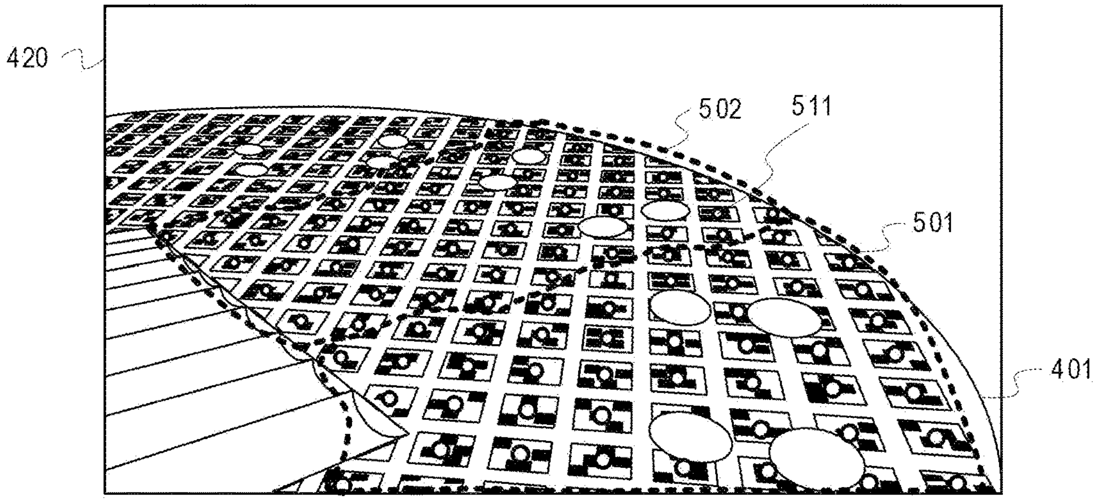
Figure 5C:
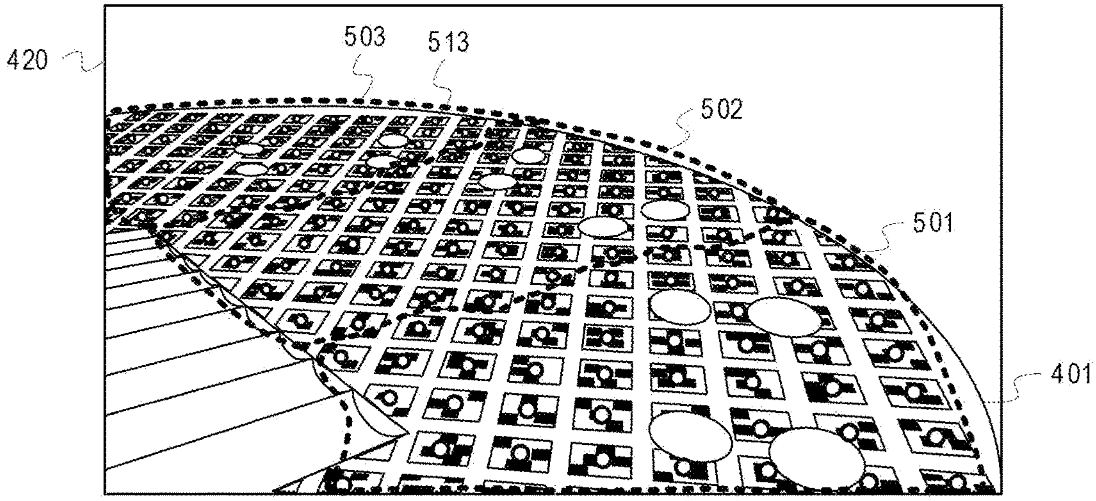
Figure 6:
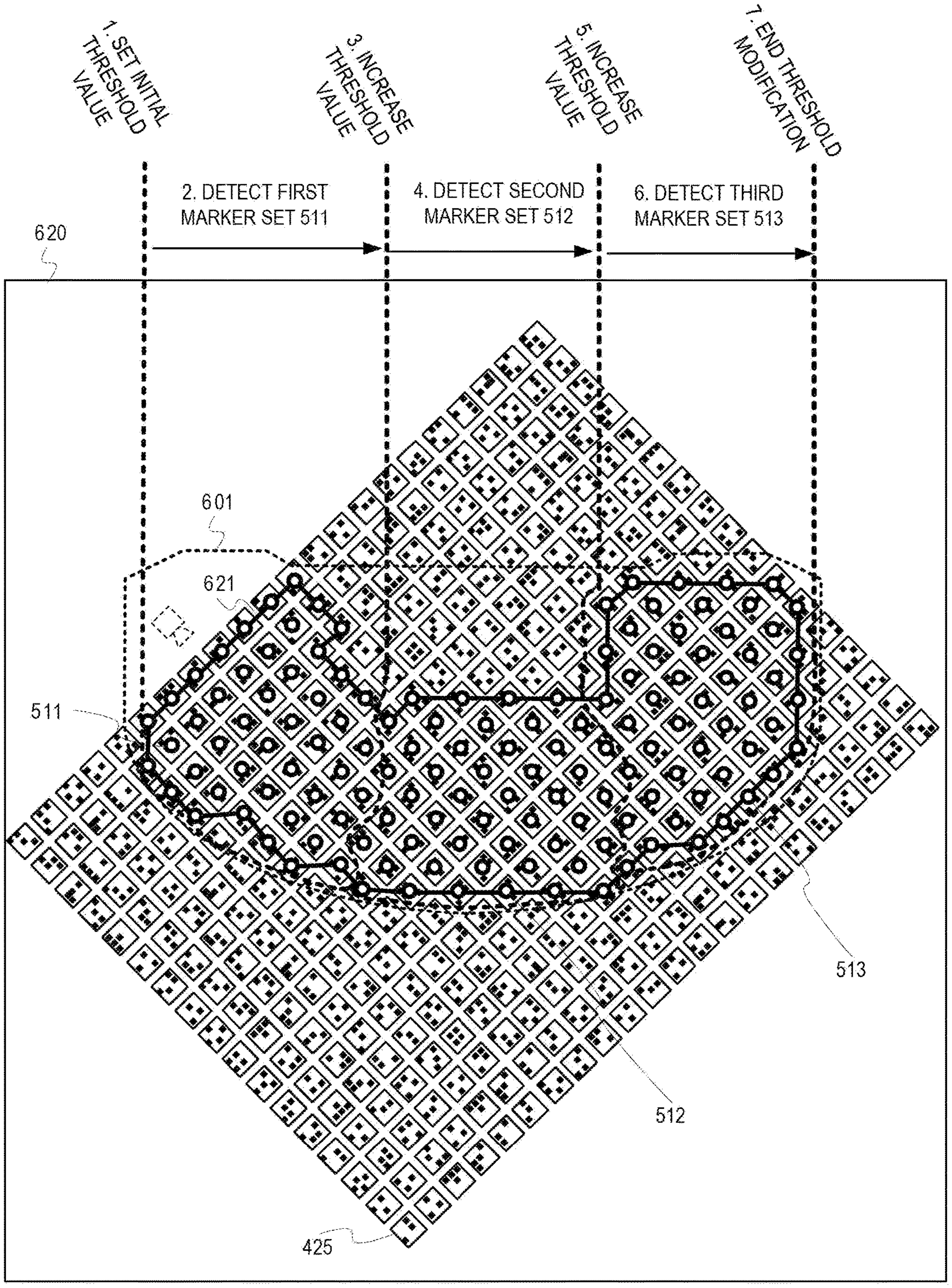

For example, in FIG. 5A, the gaming system 400 determines that only a portion of the image 420 (i.e., section 501) included any detectable markers. A large section of the gaming table 401 did not. Thus, the gaming system 400 determines that more markers may be detectable. As a result, the gaming system 400 modifies the threshold value incrementally (e.g., increases the threshold value from the initial value (e.g., "32") to a next incremental value (e.g., "40") according to a threshold increment amount set at "8"), then the gaming system 400 repeats processing blocks 308 and 310. For instance, as shown in FIG. 5B, after the gaming system 400 increases the threshold value, a second section 502 of the set of visible markers on the surface 404 becomes detectable (i.e., second marker set 512). The gaming system 400 further determines that more markers can be detected and so increases the threshold value again (e.g., increases the threshold value from "40" to "48"). After the additional increase, as shown in FIG. 5C, a third section 503 of the set of visible markers on the table 401 becomes detectable (i.e., third marker set 513). After the series of increments, the gaming system 400 determines that there are no more visible sections of the table 410 left to electronically analyze for the presence of markers, and thus the gaming system 400 ends the "for" loop at processing block 314. The "for" loop shown in FIG. 3 may also be referred to herein, according to some embodiments, as a "marker detection loop" for sake of brevity. In some embodiments, the gaming system 400 may repeat the marker detection loop until the threshold value reaches a limit (e.g., until the threshold value is so high that all pixels would appear completely black, thus revealing no markers).

The example shown in FIG. 5A-5C showed only three iterations of the marker detection loop over a specific range of threshold values. In other instances, however, the gaming system 400 may perform the marker detection loop less than three times or more than three times, with each iteration causing differing sections of the visible set of markers to become detectable. The number of iterations required may vary based on the environmental lighting to which the gaming table 401 is exposed. In some instances, the gaming system 400 may reach a maximum limit for the range of threshold values (e.g., reaches the maximum pixel intensity limit of "255" for an 8-bit grayscale image). If so, then the gaming system 400 also ends the marker detection loop.

In some instances, if the gaming system 400 reaches the maximum limit, and if the gaming system 400 also determines that portions of the gaming table 401 may include detectable markers (e.g., if the gaming system 400 determines that no markers were found over any portions of the gaming table 401 where markers would be expected to appear), then the gaming system 400 can repeat the marker detection loop using a smaller threshold increment amount for the threshold value. Furthermore, in some embodiments, the gaming system 400 can automatically modify the threshold increment amount to be larger or smaller based on an amount of visible markers that were detected for any iteration of the marker detection loop. For instance, the gaming system 400 may determine that an initial threshold increment amount of "8" may detect markers very slowly (multiple iterations may detect few or no markers), and thus the gaming system 400 may increase the threshold increment amount to a larger number. If, in response to the increase of the threshold increment amount, the gaming system 400 detects a larger number of markers, then the gaming system 400 may continue to utilize the new threshold increment amount for a remainder of iterations or until the gaming system 400 begins to detect few or no markers again (at which time the gaming system 400 can modify the threshold increment amount again). In some instances, however, if the increase in the threshold increment amount continues to result in few or no detected makers, the gaming system 400 may instead reduce the threshold increment amount to be lower than the initial value (e.g., lower than the initial threshold increment amount of "8"). Furthermore, in some embodiments, the gaming system 400 can roll back the threshold value to an initial range value and repeat the marker detection loop using the modified threshold increment amount.

Referring back to FIG. 3, the flow 300 continues at processing block 316 with associating a location of each detected marker in the image to identifier value(s) for each detected marker. In one example, as in FIG. 6, the gaming system 400, via one or more isomorphic transformations of the image 420, overlays the grid structure of the board 425 onto a virtual representation 601 of the gaming table 401 within a virtual scene 620. In some embodiments, the gaming system 400 determines the dimensions of the virtual representation 601 of the gaming table 401 based on one or more of dimensions of an outline 621 of the detected markers, known dimensions of the grid structure for board 425, a known position of the projector 403 relative to the projected board 425, as well as any additional reference points of interest detectable on the gaming table 425 (e.g., detected locations of a chip tray, betting circles, etc.). The grid structure of the board 425 has corresponding coordinate values at each location of each marker. Thus, the gaming system 400 modifies the virtual scene 620 to associate the relative locations of the detected markers to the coordinate values for each detected marker in the grid structure of the board 425. Over several iterations of the marker detection loop (shown in FIG. 5A-5C), the gaming system 400 associates the locations for the first marker set 511, the second marker set 512, and the third marker set 513 with their corresponding coordinate value identifiers. In some instances, the gaming system 400 can modify the number of markers on the board 425 based on detected characteristics of the outline 621. For example, the gaming system 400 can detect the shape of the outline 621. If the number of the markers on the board 425 are too few and/or are spaced too far apart, the shape of the outline 621 may appear amorphous, thus making the details of the shape of the gaming table 401 difficult to detect, thus making orientation of the gaming table 401 difficult to ascertain. Consequently, the gaming system 400 can regenerate the board 425 with a greater number of markers (e.g., smaller and more densely packed together), until the detected shape of the outline 621 has a shape that sufficiently resembles the gaming table 401 and/or has sufficient detail for accurate identification of specific characteristics of the gaming table 401 (e.g., accurate identification of objects, edges, sections, areas, ridges, corners, etc.).

Figure 7:
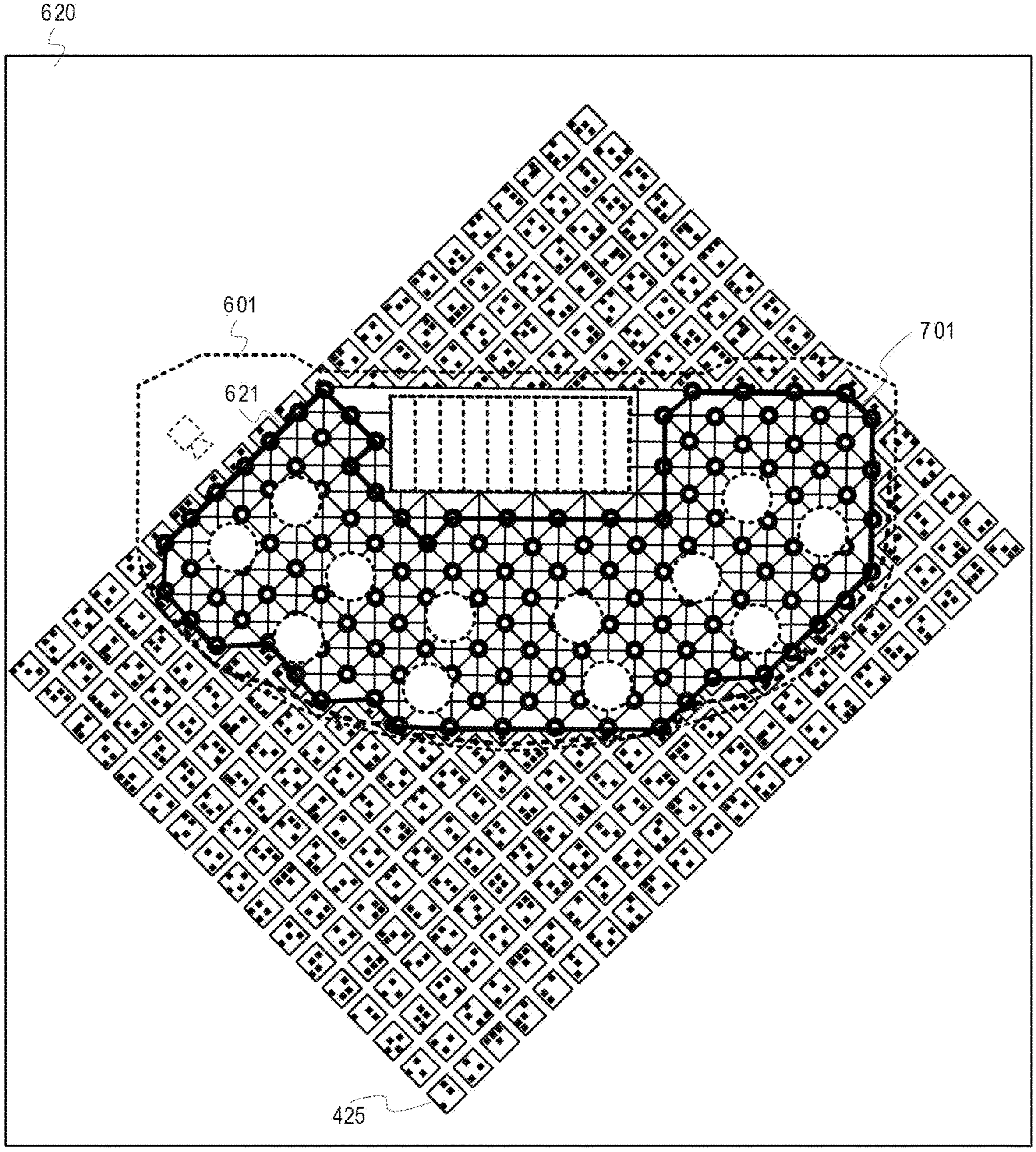

Referring back to FIG. 3, the flow 300 continues at processing block 318 with generating a virtual mesh aligned to the surface of gaming table using identifier value(s) as polygon triangulation points. In one example, as in FIG. 7, the gaming system 400 performs polygon triangulation, such as a point set triangulation, a Delaunay triangulation, etc. For instance, the gaming system selects a first set of location values for markers on the outline 621 as points on a convex hull of a simple polygon shape (i.e. the shape of the outline 621 is a simple polygon shape, meaning that the shape does not intersect itself and has no holes, or in other words is a flat shape consisting of straight, non-intersecting line segments or "sides" that are joined pairwise to form a single closed path). In response to detecting the points on the convex hull for the outline 621, the gaming system 400 draws a mesh of triangles that connect interior points (i.e., the detected markers inside of the outline 621) with the points on the convex hull. Further, the gaming system 400 draws the mesh of triangles to connect the interior points with each other. The polygon triangulation forms a two-dimensional finite element mesh, or graph, of a portion of the plane of the surface 404 of the gaming table 401 at which the projected markers were detected. One example of a polygon triangulation algorithm is "Triangle.Net," found at the following internet address: https://archive.codeplex.com/?p=triangle. Thus, as shown in FIG. 7, the gaming system 400 generates a virtual mesh 701 having interconnected virtual triangles.

Figure 8A:
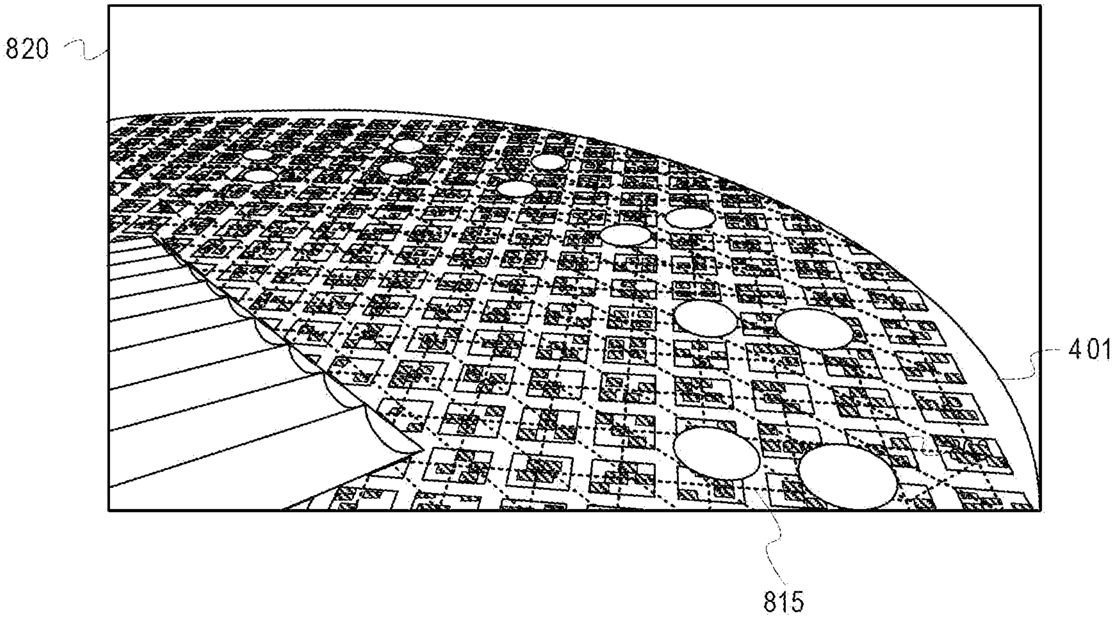
Figure 8B:
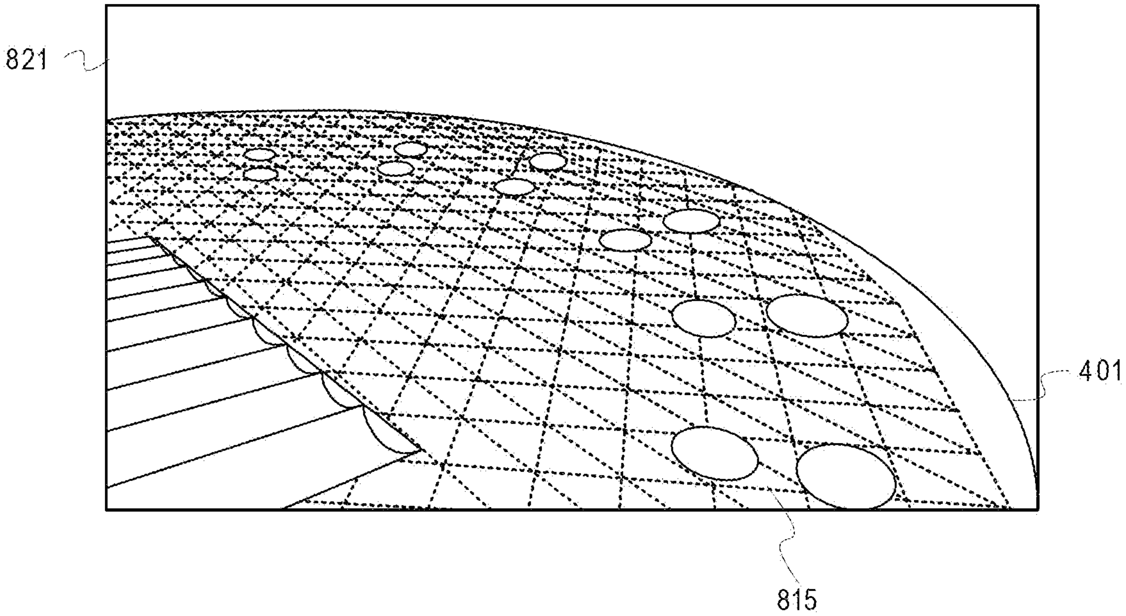

Referring back to FIG. 3, the flow 300 continues at processing block 320 with calibrating presentation of gaming content using the virtual mesh. For example, referring back to FIG. 7, the gaming system 400 identifies locations of additional detected objects from the gaming table 401, such as the chip tray 413 and/or the betting circles 405A-410A and 405B-410B. The gaming system 400 uses the coordinate identity values for the points on the virtual mesh 701 to place gaming content within the virtual scene 620. For instance, the gaming system 400 overlays representations of the chip tray 413 and the betting circles at corresponding locations within the virtual scene 620 relative to the approximate locations of the detected objects on the gaming table 401. In FIG. 8A, the gaming system 400 can project grid lines 815 for the virtual mesh 701 in relation to the visible markers. The grid lines 815 are shown depicted in an additional image 820 taken by the camera 402. FIG. 8B shows the grid lines 815 (via image 821) with the visible markers removed.

Figure 9A:
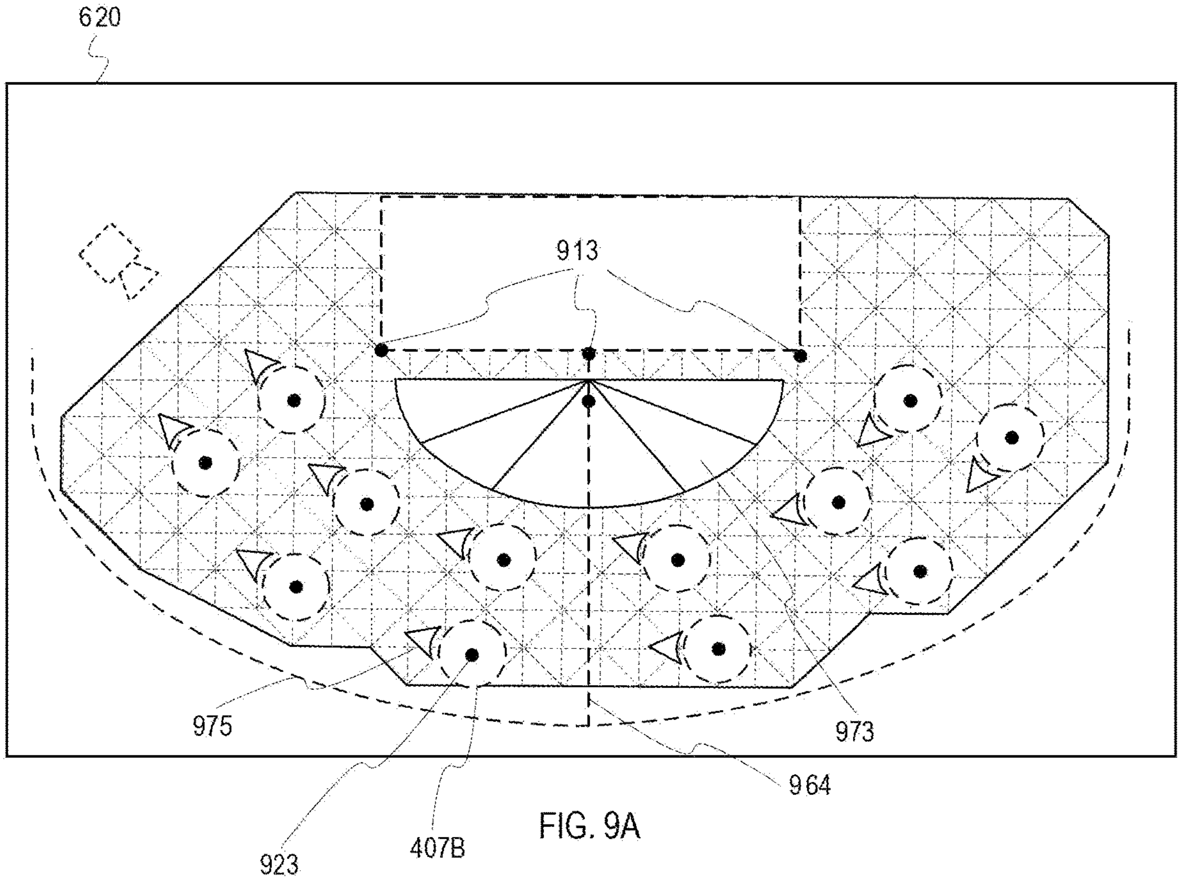
Figure 9B:
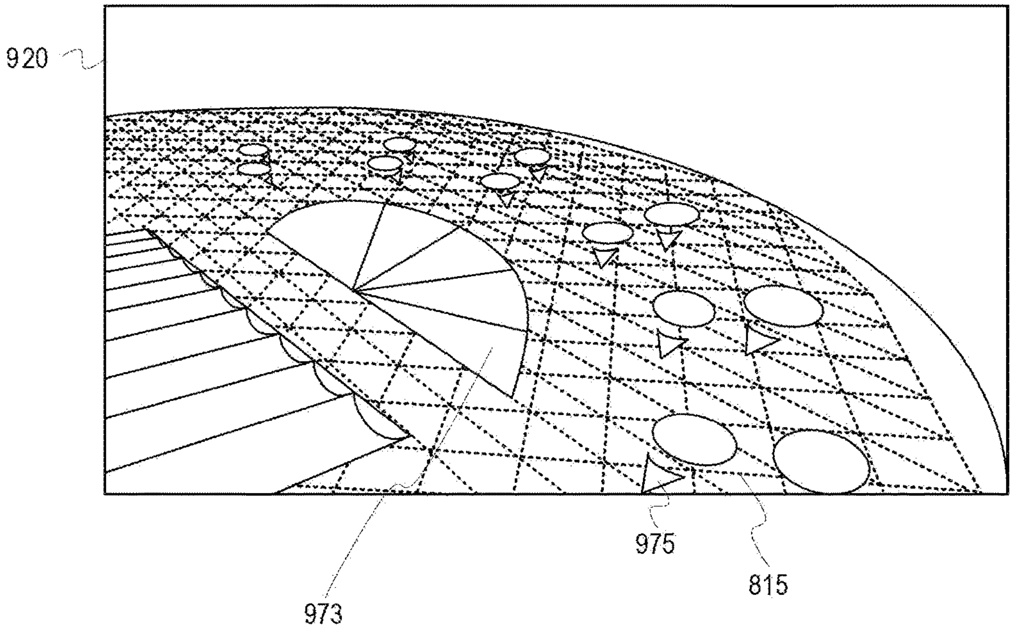

The gaming system 400 can further determine, based on the relative positions of the detected objects within the mapped coordinates, where to position gaming content (on the virtual mesh 701) relative to the detected objects. For instance, knowing the location of the detected object (e.g., chip tray locations, betting circle locations, player station locations, etc.) within the mapping, the gaming system 400 can position graphical content within the virtual scene 620 relative to the respective object. The gaming system can use the positions of the detected objects as reference points for positioning of content. For example, as shown in FIG. 9A, the gaming system 400 positions a virtual wheel graphic 973 (e.g., similar to content 173 depicted in FIG. 1) and one or more bet indicator graphics (e.g., secondary-bet, indicator graphic 975) within the virtual scene 620 relative to grid point coordinates as well as any other points of interest on the gaming table 410 (e.g., points 913 associated with the chip tray 413, one or more centroid points of the betting circles 405A-410A and 410B-410B, points associated with a detected axis of symmetry 964, etc.). For instance, the gaming system 400 positions the secondary-bet, indicator graphic 975 (referred to also as "graphic 975") based on a detected spatial relationship to a closest acceptable grid point to the associated point of interest. For example, an acceptable placement of the graphic 975 for secondary betting circle 407B includes detecting an offset (e.g., a difference in position, orientation, etc.) between a coordinate point for the centroid 923 for secondary betting circle 407B and a nearest coordinate point (e.g., triangle point on the virtual mesh 701) at which an anchor (e.g., a centroid) for the graphic 975 can be placed, when oriented appropriately, without overlapping (or otherwise obstructing a detected surface area occupied by) the secondary betting circle 407B. The gaming system 400 can store the offset in memory and use it for projecting content at a later time. FIG. 9B, illustrates a calibration of the positioning of the gaming content (e., virtual wheel graphic 973 and bet indicator graphic(s) 975) within an image 920 taken by the camera 402 after calibration. In FIG. 9B, the grid lines 815 for the virtual mesh 701 are shown as reference, however in some embodiments, the grid lines 815 can be transparent from view.

The embodiments described in FIGS. 1, 2, 3, 4, 5A, 5B, 5C, 6, 7, 8A, 8B, 9A and 9B are some examples of a self-referential gaming system. Additional embodiments are described further below of a gaming system similar to gaming system 100 (FIG. 1), gaming system 200 (FIG. 2) gaming system 400 (FIG. 4), etc. or any element of the gaming system.

In some embodiments, the gaming system automatically modifies properties of a camera (e.g., exposure, light sensitivity, aperture size, shutter speed, focus, zoom, ISO, image sensor settings, etc.) to provide the best quality images from which to analyze objects (e.g., gaming tokens, cards, projected markers, non-projected objects, etc.) for information that could identify values (e.g., chip values, card face values, symbol values, coordinate values, fiducial orientations, manufacturer settings, layout dimensions, presentation requirement settings, barcode values, etc.).

In some embodiments, the gaming system modifies camera properties based on a mode. For example, for a bet mode, the gaming system automatically sets the camera settings to the highest quality possible so as to ensure proper identification of placed bets. For example, the gaming system modifies the camera settings to longer exposure times and greater light sensitivity. On the other hand, in a second mode, such as a play mode, the gaming system modifies the camera settings to different values to optimize for quick motion, such as movement of hands, cards, etc. For example, the gaming system modifies the camera settings for shorter exposure times and lower light sensitivity.

In some instances, the gaming system incrementally modifies camera settings. As those settings are modified incrementally, multiple images are taken from the same camera using the different camera settings. From the multiple images, the gaming system can identify additional features of objects, such as additional portions of a projected board of markers. For instance, in a low-lighting environment, such as a casino floor, a camera at a gaming table may take a picture of the projected board of markers at a given light sensitivity setting that results in a first image. The gaming system analyzes the first image and identifies markers (or other objects) that are located close to the camera. However, the objects in the first image that are far from the camera appear dark. In other words, in the first image, projected markers beyond a certain distance from the camera are unidentifiable by the gaming system (e.g., by a neural network model), resulting in an incomplete view of the portion of the board of markers that appears on the surface of the gaming table. According to some embodiments, the gaming system can modify the properties of the first image, such as by modifying camera settings (e.g., modifying a camera exposure setting, modifying a brightness and/or contrast setting, etc.), resulting in at least one additional version of the first image (e.g., a second image). The gaming system then analyzes the second image to detect additional objects far from the camera. In some instances, the gaming system determines whether the change that was made resulted in a detection of image details of additional objects that were previously undetected. For instance, if more details of an object, or group of objects, are visible in the second image, then the gaming system determines that the change to the particular graphical property (e.g., via the change to the camera's optical settings) was useful and adjusts a subsequent iteration of the modifying step according to the determination. For example, if the image quality results in identification (by the neural network model) of additional ones of the markers, then the gaming system can increase the value for the graphic property that was changed in the previous iteration to a greater degree, until no more markers can be identified. On the other hand, if the image quality was worse, or no better than before (e.g., no additional barcodes are detected), the gaming system can adjust the value in a different way (e.g., reduces a camera setting value instead of increasing it).

In another example, the gaming system modifies a plurality of different graphical properties and/or settings concurrently. In yet another example, the gaming system automatically modifies an exposure setting to an optimal point for any given gaming mode, any gaming environment condition, etc. (e.g., varying a modification of the exposure setting upward and downward sequentially to determine which setting reveals the desired image quality given a specific frame rate requirement for a stream of image data given a specific game mode or environmental condition). In some embodiments, such as for flow 300 mentioned in FIG. 3, the gaming system can automatically change the exposure setting at the start of (or during) each of the iterations of the loop (e.g., before or during the marker detection loop). In some instances, the gaming system determines how many markers are detectable based on the exposure changes. The gaming system can then set the exposure for the camera to a setting that results in the most detected markers.

In another embodiment, the gaming system provides an option for a manual adjustment to a camera setting. For example, the gaming system can pause and request an operator to manually inspect an image for the best quality and to manually change a setting (e.g., an exposure setting) based on the inspection. The gaming system can then capture an image in response to a user input indicating that the settings were manually adjusted.

In some embodiments, the gaming system automatically modifies projection aspects, such as properties, settings, modes, etc. of a projector (e.g., brightness or luminosity levels, contrast settings, color vibrancy settings, color space settings, focus, zoom, power usage, network connectivity settings, mode settings, etc.) or other aspects of the system related to projection (e.g., aspects of graphical rendering of content in a virtual scene to aid in calibration).

In some embodiments, the gaming system uses the projector to assist in optimal image capture by providing optimal lighting for various parts of a gaming table. For instance, the projector light settings can be modified to project certain amounts of light to different portions of the table to balance out lighting imbalances from ambient lighting. For instance, the gaming system can project a solid color, such as white light, to illuminate specifically selected areas, objects, etc. associated with a gaming table surface. For example, the gaming system can project white light at a front face of chip stacks to get the best possible light conditions for image capture so that neural network model can detect chip edges, colors, shapes, etc.

In some embodiments, the gaming system projects white light and/or other identifiers at edges of objects (e.g., at fingers, chips, etc.) that are near the surface of the gaming table. In some embodiments, the gaming system projects bright light at an object to determine, via electronic analysis of an image, whether a shadow appears underneath the object. The gaming system can use the detection of the shadow to infer that the object is not touching the surface. In some embodiments, the gaming system projects an object with a structure or element that, if it appears on the object and/or if it shows sufficient continuity with a pattern projected onto the surface, means that the object was close enough to the surface to be touching. For instance, if a color and/or pattern shows clearly on the fingernail in a way that would only appear if the finger tip was a certain distance to the surface material (e.g., a small diamond shape that is projected by the projector appears on the finger nail), then the gaming system can predict that the finger was touching the surface. In another example, if the color and/or pattern is detectable on a bottom edge of a gaming chip and has continuity with the projected portion of the identifier projected onto the table surface right next the chip, or in other words the pattern appears continuous from the surface to the chip, without a dark gap between, then the gaming system infers that the chip is touching the surface.

In some embodiments, the gaming system can modify projection aspects per mode. For example, in a betting mode, the gaming system may need higher image quality for detection of certain values of chips, chip stacks, etc. Thus, the gaming system modifies projection properties to provide lighting that produces the highest quality images for the conditions of the gaming environment (e.g., continuous, diffused light). On the other hand, in a second mode, such as a play mode, the projection properties may be set to different settings or values (e.g., a focused lighting mode, a flash lighting mode, etc.), such as to optimize image quality (e.g., reduce possible blur) that may be caused by a quick movement of hands, cards, etc.

In some embodiments, the gaming system can optimize projection aspects to compensate for shadows. For instance, if a projected light is casting harsh shadows, the gaming system can auto-mask specific objects within a virtual scene and auto adjust the specific amount of light thrown at the object by modifying the projected content on the mask. For example, the gaming system can, in a virtual scene for the content, overlay a graphical mask at a location of a detected object and render a graphic of the light color and/or identifier onto the mask. In addition, the mask can have a transparency/opacity property, such that the gaming system can reduce an opacity of the layer, thus reducing the potential brightness and/or detail of the projected content, thus allowing it to carefully determine a degree of darkness of shadows being generated by the projected content.

In some embodiments, the gaming system modifies graphical properties of projected identifiers to allow for detectability. For example, the gaming system changes a color of all, or parts, of projected objects (e.g., markers, boards, etc.) based on detected background colors. By changing the colors of the projected objects to have high contrast with the background, the gaming system provides an image that visibly depicts the best contrast of a projected object against the surrounding portions of the surface shown in an image.

Figure 10:
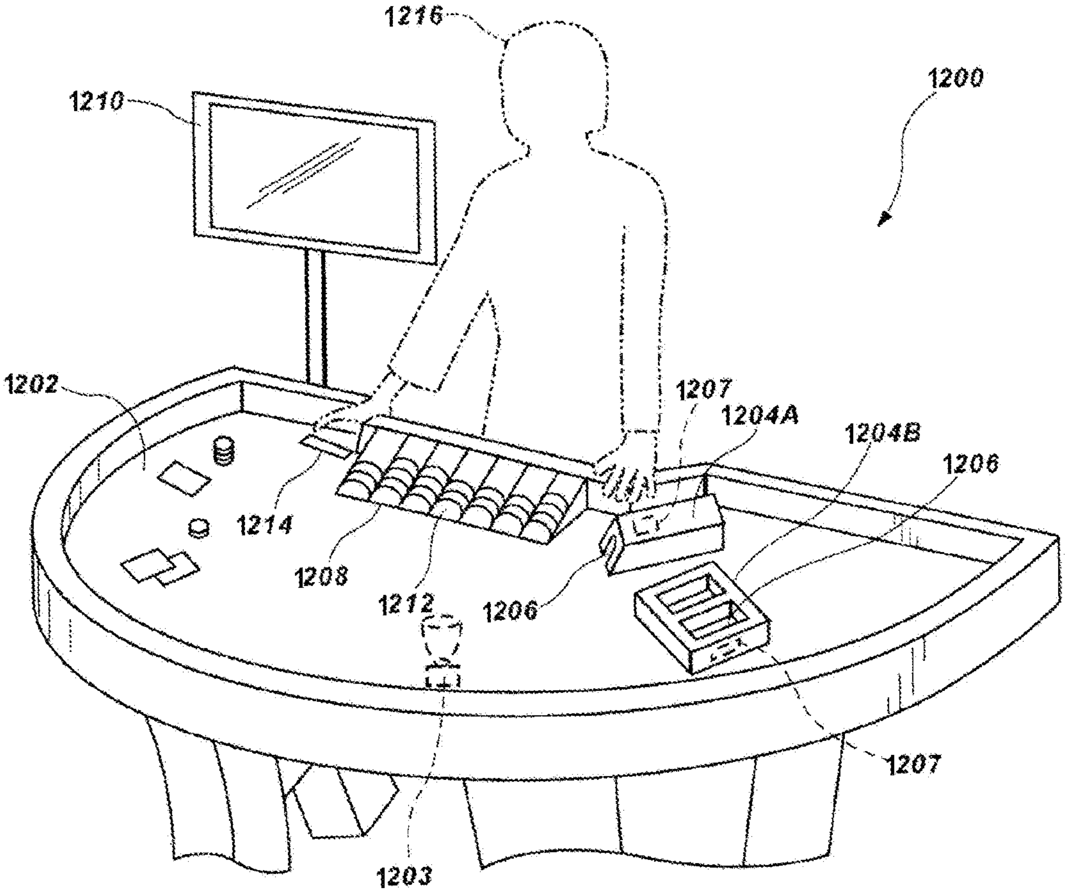
FIG. 10 is a perspective view of a gaming table configured for implementation of embodiments of wagering games in accordance with this disclosure.

FIG. 10 is a perspective view of an embodiment of a gaming table 1200 (which may be configured as the gaming table 101 or the gaming table 401) for implementing wagering games in accordance with this disclosure. The gaming table 1200 may be a physical article of furniture around which participants in the wagering game may stand or sit and on which the physical objects used for administering and otherwise participating in the wagering game may be supported, positioned, moved, transferred, and otherwise manipulated. For example, the gaming table 1200 may include a gaming surface 1202 (e.g., a table surface) on which the physical objects used in administering the wagering game may be located. The gaming surface 1202 may be, for example, a felt fabric covering a hard surface of the table, and a design, conventionally referred to as a "layout," specific to the game being administered may be physically printed on the gaming surface 1202. As another example, the gaming surface 1202 may be a surface of a transparent or translucent material (e.g., glass or plexiglass) onto which a projector 1203, which may be located, for example, above or below the gaming surface 1202, may illuminate a layout specific to the wagering game being administered. In such an example, the specific layout projected onto the gaming surface 1202 may be changeable, enabling the gaming table 1200 to be used to administer different variations of wagering games within the scope of this disclosure or other wagering games. In either example, the gaming surface 1202 may include, for example, designated areas for player positions; areas in which one or more of player cards, dealer cards, or community cards may be dealt; areas in which wagers may be accepted; areas in which wagers may be grouped into pots; and areas in which rules, pay tables, and other instructions related to the wagering game may be displayed. As a specific, nonlimiting example, the gaming surface 1202 may be configured as any table surface described herein.

In some embodiments, the gaming table 1200 may include a display 1210 separate from the gaming surface 1202. The display 1210 may be configured to face players, prospective players, and spectators and may display, for example, information randomly selected by a shuffler device and also displayed on a display of the shuffler device; rules; pay tables; real-time game status, such as wagers accepted and cards dealt; historical game information, such as amounts won, amounts wagered, percentage of hands won, and notable hands achieved; the commercial game name, the casino name, advertising and other instructions and information related to the wagering game. The display 1210 may be a physically fixed display, such as an edge lit sign, in some embodiments. In other embodiments, the display 1210 may change automatically in response to a stimulus (e.g., may be an electronic video monitor).

The gaming table 1200 may include particular machines and apparatuses configured to facilitate the administration of the wagering game. For example, the gaming table 1200 may include one or more card-handling devices 1204A, 1204B. The card-handling device 1204A may be, for example, a shoe from which physical cards 1206 from one or more decks of intermixed playing cards may be withdrawn, one at a time. Such a card-handling device 1204A may include, for example, a housing in which cards 1206 are located, an opening from which cards 1206 are removed, and a card-presenting mechanism (e.g., a moving weight on a ramp configured to push a stack of cards down the ramp) configured to continually present new cards 1206 for withdrawal from the shoe.

In some embodiments in which the card-handling device 1204A is used, the card-handling device 1204A may include a random number generator 151 and the display 152, in addition to or rather than such features being included in a shuffler device. In addition to the card-handling device 1204A, the card-handling device 1204B may be included. The card-handling device 1204B may be, for example, a shuffler configured to select information (using a random number generator), to display the selected information on a display of the shuffler, to reorder (either randomly or pseudo-randomly) physical playing cards 1206 from one or more decks of playing cards, and to present randomized cards 1206 for use in the wagering game. Such a card-handling device 1204B may include, for example, a housing, a shuffling mechanism configured to shuffle cards, and card inputs and outputs (e.g., trays). Shufflers may include card recognition capability that can form a randomly ordered set of cards within the shuffler. The card-handling device 1204 may also be, for example, a combination shuffler and shoe in which the output for the shuffler is a shoe.

In some embodiments, the card-handling device 1204 may be configured and programmed to administer at least a portion of a wagering game being played utilizing the card-handling device 1204. For example, the card-handling device 1204 may be programmed and configured to randomize a set of cards and deliver cards individually for use according to game rules and player and or dealer game play elections. More specifically, the card-handling device 1204 may be programmed and configured to, for example, randomize a set of six complete decks of cards including one or more standard 52-card decks of playing cards and, optionally, any specialty cards (e.g., a cut card, bonus cards, wild cards, or other specialty cards). In some embodiments, the card-handling device 1204 may present individual cards, one at a time, for withdrawal from the card-handling device 1204. In other embodiments, the card-handling device 1204 may present an entire shuffled block of cards that are transferred manually or automatically into a card dispensing shoe 1204. In some such embodiments, the card-handling device 1204 may accept dealer input, such as, for example, a number of replacement cards for discarded cards, a number of hit cards to add, or a number of partial hands to be completed. In other embodiments, the device may accept a dealer input from a menu of game options indicating a game selection, which will select programming to cause the card-handling device 1204 to deliver the requisite number of cards to the game according to game rules, player decisions and dealer decisions. In still other embodiments, the card-handling device 1204 may present the complete set of randomized cards for manual or automatic withdrawal from a shuffler and then insertion into a shoe. As specific, nonlimiting examples, the card-handling device 1204 may present a complete set of cards to be manually or automatically transferred into a card dispensing shoe, or may provide a continuous supply of individual cards.

In another embodiment, the card handling device may be a batch shuffler, such as by randomizing a set of cards using a gripping, lifting, and insertion sequence.

In some embodiments, the card-handling device 1204 may employ a random number generator device to determine card order, such as, for example, a final card order or an order of insertion of cards into a compartment configured to form a packet of cards. The compartments may be sequentially numbered, and a random number assigned to each compartment number prior to delivery of the first card. In other embodiments, the random number generator may select a location in the stack of cards to separate the stack into two sub-stacks, creating an insertion point within the stack at a random location. The next card may be inserted into the insertion point. In yet other embodiments, the random number generator may randomly select a location in a stack to randomly remove cards by activating an ejector.

Regardless of whether the random number generator (or generators) is hardware or software, it may be used to implement specific game administrations methods of the present disclosure.

The card-handling device 1204 may simply be supported on the gaming surface 1202 in some embodiments. In other embodiments, the card-handling device 1204 may be mounted into the gaming table 1202 such that the card-handling device 1204 is not manually removable from the gaming table 1202 without the use of tools. In some embodiments, the deck or decks of playing cards used may be standard, 52-card decks. In other embodiments, the deck or decks used may include cards, such as, for example, jokers, wild cards, bonus cards, etc. The shuffler may also be configured to handle and dispense security cards, such as cut cards.

In some embodiments, the card-handling device 1204 may include an electronic display 1207 for displaying information related to the wagering game being administered. The electronic display 1207 may display a menu of game options, the name of the game selected, the number of cards per hand to be dispensed, acceptable amounts for other wagers (e.g., maximums and minimums), numbers of cards to be dealt to recipients, locations of particular recipients for particular cards, winning and losing wagers, pay tables, winning hands, losing hands, and payout amounts. In other embodiments, information related to the wagering game may be displayed on another electronic display, such as, for example, the display 1210 described previously.

The type of card-handling device 1204 employed to administer embodiments of the disclosed wagering game, as well as the type of card deck employed and the number of decks, may be specific to the game to be implemented. Cards used in games of this disclosure may be, for example, standard playing cards from one or more decks, each deck having cards of four suits (clubs, hearts, diamonds, and spades) and of rankings ace, king, queen, jack, and ten through two in descending order. As a more specific example, six, seven, or eight standard decks of such cards may be intermixed. Typically, six or eight decks of 52 standard playing cards each may be intermixed and formed into a set to administer a blackjack or blackjack variant game. After shuffling, the randomized set may be transferred into another portion of the card-handling device 1204B or another card-handling device 1204A altogether, such as a mechanized shoe capable of reading card rank and suit.

The gaming table 1200 may include one or more chip racks 1208 configured to facilitate accepting wagers, transferring lost wagers to the house, and exchanging monetary value for wagering elements 1212 (e.g., chips). For example, the chip rack 1208 may include a series of token support rows, each of which may support tokens of a different type (e.g., color and denomination). In some embodiments, the chip rack 1208 may be configured to automatically present a selected number of chips using a chip-cutting-and-delivery mechanism. In some embodiments, the gaming table 1200 may include a drop box 1214 for money that is accepted in exchange for wagering elements or chips 1212. The drop box 1214 may be, for example, a secure container (e.g., a safe or lockbox) having a one-way opening into which money may be inserted and a secure, lockable opening from which money may be retrieved. Such drop boxes 1214 are known in the art, and may be incorporated directly into the gaming table 1200 and may, in some embodiments, have a removable container for the retrieval of money in a separate, secure location.

When administering a wagering game in accordance with embodiments of this disclosure, a dealer 1216 may receive money (e.g., cash) from a player in exchange for wagering elements 1212. The dealer 1216 may deposit the money in the drop box 1214 and transfer physical wagering elements 1212 to the player. As part of the method of administering the game, the dealer 1216 may accept one or more initial wagers from the player, which may be reflected by the dealer 1216 permitting the player to place one or more wagering elements 1212 or other wagering tokens (e.g., cash) within designated areas on the gaming surface 1202 associated with the various wagers of the wagering game. Once initial wagers have been accepted, the dealer 1216 may remove physical cards 1206 from the card-handling device 1204 (e.g., individual cards, packets of cards, or the complete set of cards) in some embodiments. In other embodiments, the physical cards 1206 may be hand-pitched (i.e., the dealer 1216 may optionally shuffle the cards 1206 to randomize the set and may hand-deal cards 1206 from the randomized set of cards). The dealer 1216 may position cards 1206 within designated areas on the gaming surface 1202, which may designate the cards 1206 for use as individual player cards, community cards, or dealer cards in accordance with game rules. House rules may require the dealer to accept both main and secondary wagers before card distribution. House rules may alternatively allow the player to place only one wager (i.e., the second wager) during card distribution and after the initial wagers have been placed, or after card distribution but before all cards available for play are revealed.

In some embodiments, after dealing the cards 1206, and during play, according to the game rules, any additional wagers (e.g., the play wager) may be accepted, which may be reflected by the dealer 1216 permitting the player to place one or more wagering elements 1212 within the designated area (i.e., area 124) on the gaming surface 1202 associated with the play wager of the wagering game. The dealer 1216 may perform any additional card dealing according to the game rules. Finally, the dealer 1216 may resolve the wagers, award winning wagers to the players, which may be accomplished by giving wagering elements 1212 from the chip rack 1208 to the players, and transferring losing wagers to the house, which may be accomplished by moving wagering elements 1212 from the player designated wagering areas to the chip rack 1208.

Figure 11:
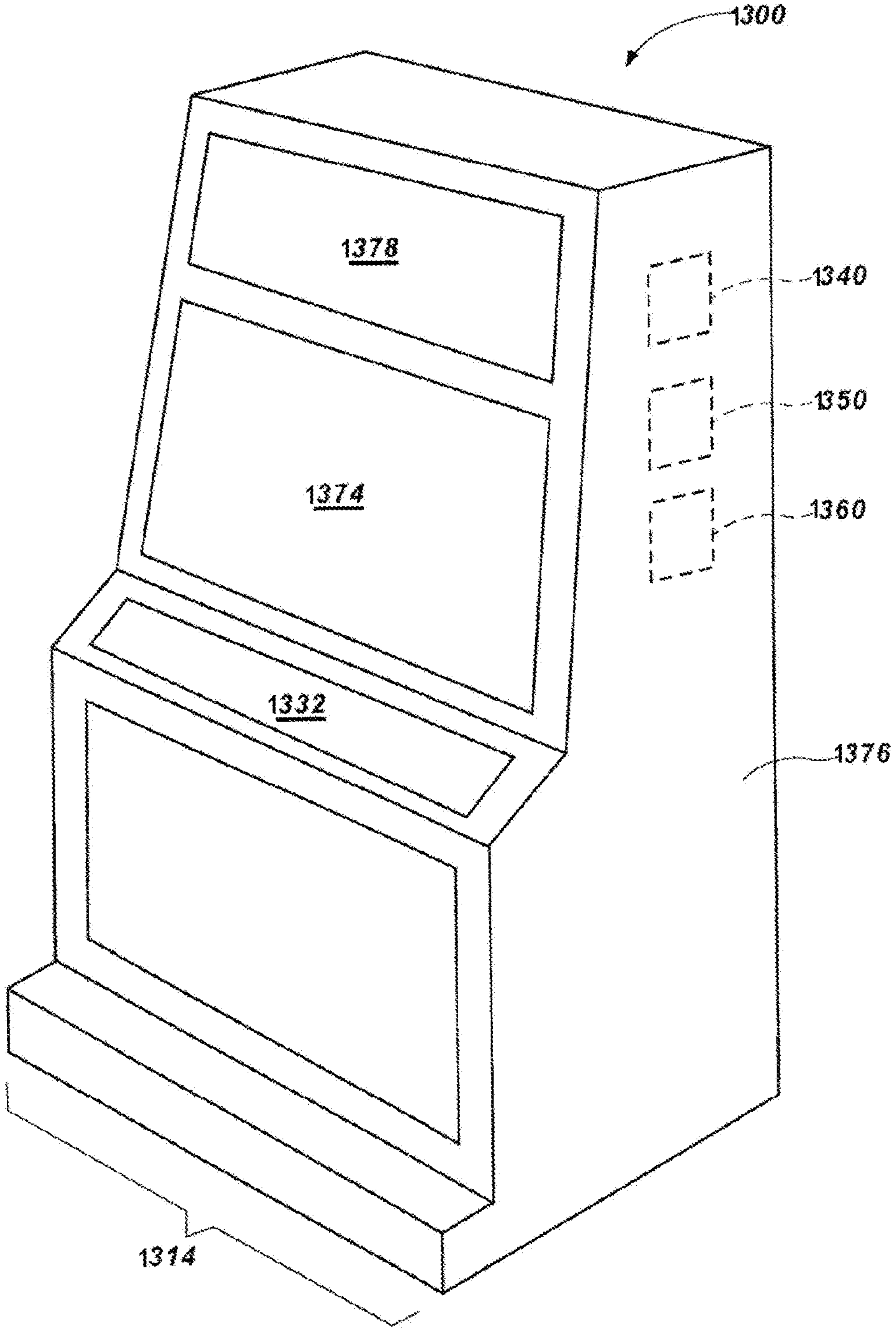
FIG. 11 is a perspective view of an individual electronic gaming device configured for implementation of embodiments of wagering games in accordance with this disclosure.

FIG. 11 is a perspective view of an individual electronic gaming device 1300 (e.g., an electronic gaming machine (EGM)) configured for implementing wagering games according to this disclosure. The individual electronic gaming device 1300 may include an individual player position 1314 including a player input area 1332 configured to enable a player to interact with the individual electronic gaming device 1300 through various input devices (e.g., buttons, levers, touchscreens). The player input area 1332 may further includes a cash- or ticket-in receptor, by which cash or a monetary-valued ticket may be fed, by the player, to the individual electronic gaming device 1300, which may then detect, in association with game-logic circuitry in the individual electronic gaming device 1300, the physical item (cash or ticket) associated with the monetary value and then establish a credit balance for the player. In other embodiments, the individual electronic gaming device 1300 detects a signal indicating an electronic wager was made. Wagers may then be received, and covered by the credit balance, upon the player using the player input area 1332 or elsewhere on the machine (such as through a touch screen). Won payouts and pushed or returned wagers may be reflected in the credit balance at the end of the round, the credit balance being increased to reflect won payouts and pushed or returned wagers and/or decreased to reflect lost wagers.

The individual electronic gaming device 1300 may further include, in the individual player position 1312, a ticket-out printer or monetary dispenser through which a payout from the credit balance may be distributed to the player upon receipt of a cashout instruction, input by the player using the player input area 1332.

The individual electronic gaming device 1300 may include a gaming screen 1374 configured to display indicia for interacting with the individual electronic gaming device 1300, such as through processing one or more programs stored in game-logic circuitry providing memory 1340 to implement the rules of game play at the individual electronic gaming device 1300. Accordingly, in some embodiments, game play may be accommodated without involving physical playing cards, chips or other wagering elements, and live personnel. The action may instead be simulated by a control processor 1350 operably coupled to the memory 1340 and interacting with and controlling the individual electronic gaming device 1300. For example, the processor may cause the display 1374 to display cards, including virtual player and virtual dealer cards for playing games of the present disclosure.

Although the individual electronic gaming device 1300 displayed in FIG. 11 has an outline of a traditional gaming cabinet, the individual electronic gaming device 1300 may be implemented in other ways, such as, for example, on a bartop gaming terminal, through client software downloaded to a portable device, such as a smart phone, tablet, or laptop computer. The individual electronic gaming device 1300 may also be a non-portable personal computer (e.g., a desktop or all-in-one computer) or other computing device. In some embodiments, client software is not downloaded but is native to the device or is otherwise delivered with the device when distributed. In such embodiments, the credit balance may be established by receiving payment via credit card or player's account information input into the system by the player. Cashouts of the credit balance may be allotted to a player's account or card.

A communication device 1360 may be included and operably coupled to the processor 1350 such that information related to operation of the individual electronic gaming device 1300, information related to the game play, or combinations thereof may be communicated between the individual electronic gaming device 1300 and other devices, such as a server, through a suitable communication medium, such, as, for example, wired networks, Wi-Fi networks, and cellular communication networks.

The gaming screen 1374 may be carried by a generally vertically extending cabinet 1376 of the individual electronic gaming device 1300. The individual electronic gaming device 1300 may further include banners to communicate rules of game play, instructions, game play advice or hints and the like, such as along a top portion 1378 of the cabinet 1376 of the individual electronic gaming device 1300. The individual electronic gaming device 1300 may further include additional decorative lights (not shown), and speakers (not shown) for transmitting and optionally receiving sounds during game play.

Some embodiments may be implemented at locations including a plurality of player stations. Such player stations may include an electronic display screen for display of game information (e.g., cards, wagers, and game instructions) and for accepting wagers and facilitating credit balance adjustments. Such player stations may, optionally, be integrated in a table format, may be distributed throughout a casino or other gaming site, or may include both grouped and distributed player stations.

Figure 12:
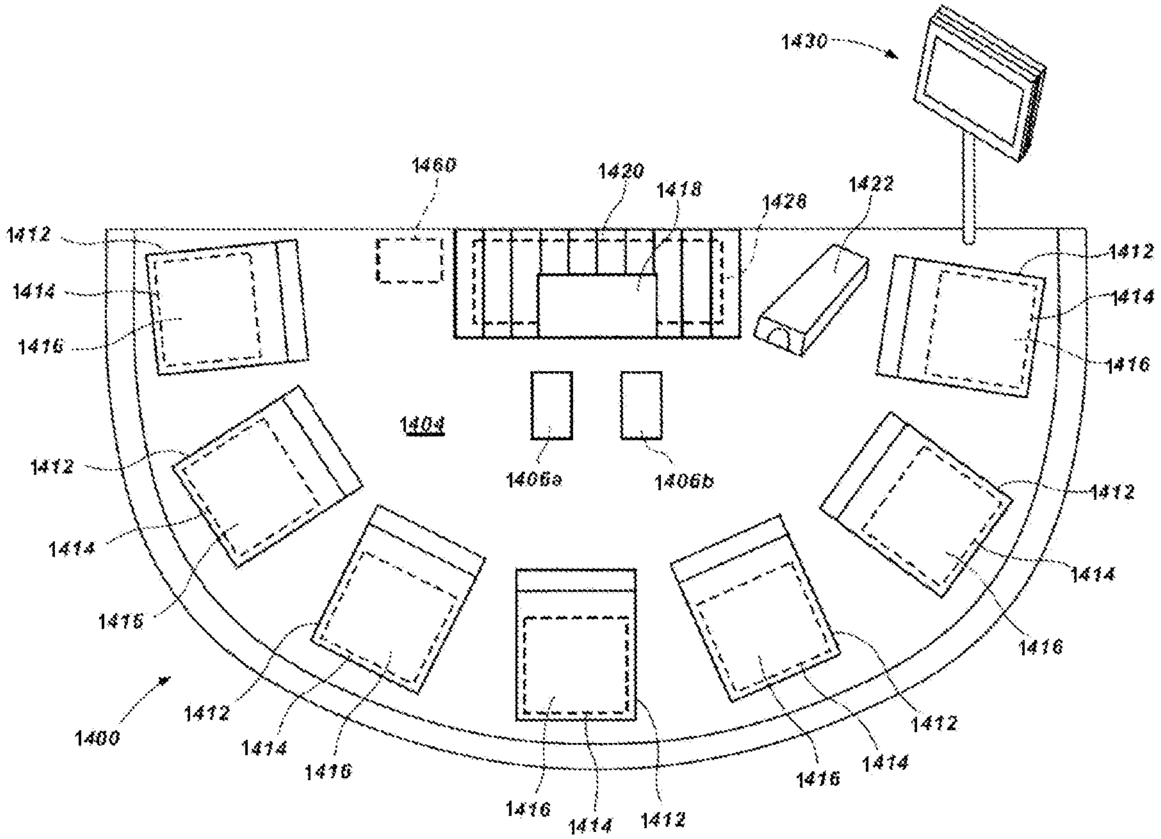
FIG. 12 is a top view of a table configured for implementation of embodiments of wagering games in accordance with this disclosure.

FIG. 12 is a top view of a suitable table 1010 configured for implementing wagering games according to this disclosure. The table 1010 may include a playing surface 1404. The table 1010 may include electronic player stations 1412. Each player station 1412 may include a player interface 1416, which may be used for displaying game information (e.g., graphics illustrating a player layout, game instructions, input options, wager information, game outcomes, etc.) and accepting player elections. The player interface 1416 may be a display screen in the form of a touch screen, which may be at least substantially flush with the playing surface 1404 in some embodiments. Each player interface 1416 may be operated by its own local game processor 1414 (shown in dashed lines), although, in some embodiments, a central game processor 1428 (shown in dashed lines) may be employed and may communicate directly with player interfaces 1416. In some embodiments, a combination of individual local game processors 1414 and the central game processor 1428 may be employed. Each of the processors 1414 and 1428 may be operably coupled to memory including one or more programs related to the rules of game play at the table 1010.

A communication device 1460 may be included and may be operably coupled to one or more of the local game processors 1414, the central game processor 1428, or combinations thereof, such that information related to operation of the table 1010, information related to the game play, or combinations thereof may be communicated between the table 1010 and other devices through a suitable communication medium, such as, for example, wired networks, Wi-Fi networks, and cellular communication networks.

The table 1010 may further include additional features, such as a dealer chip tray 1420, which may be used by the dealer to cash players in and out of the wagering game, whereas wagers and balance adjustments during game play may be performed using, for example, virtual chips (e.g., images or text representing wagers). For embodiments using physical cards 1406*a* and 1406*b*, the table 1010 may further include a card-handling device 1422 such as a card shoe configured to read and deliver cards that have already been randomized. For embodiments using virtual cards, the virtual cards may be displayed at the individual player interfaces 1416. Physical playing cards designated as "common cards" may be displayed in a common card area.

The table 1010 may further include a dealer interface 1418, which, like the player interfaces 1416, may include touch screen controls for receiving dealer inputs and assisting the dealer in administering the wagering game. The table 1010 may further include an upright display 1430 configured to display images that depict game information, pay tables, hand counts, historical win/loss information by player, and a wide variety of other information considered useful to the players. The upright display 1430 may be double sided to provide such information to players as well as to casino personnel.

Although an embodiment is described showing individual discrete player stations, in some embodiments, the entire playing surface 1404 may be an electronic display that is logically partitioned to permit game play from a plurality of players for receiving inputs from, and displaying game information to, the players, the dealer, or both.

Figure 13:
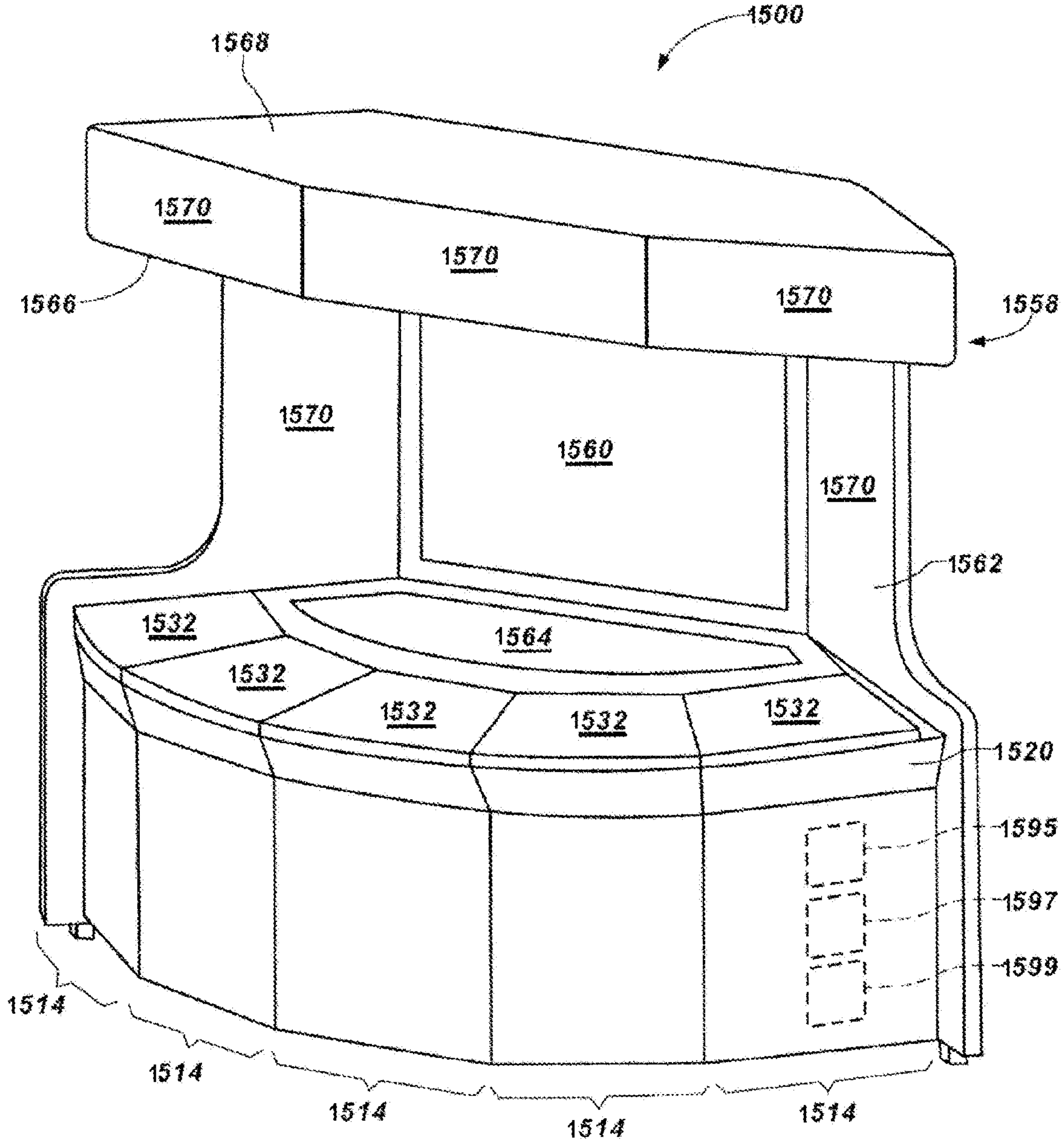
FIG. 13 is a perspective view of another embodiment of a table configured for implementation of embodiments of wagering games in accordance with this disclosure, wherein the implementation includes a virtual dealer.

FIG. 13 is a perspective view of another embodiment of a suitable electronic multi-player table 1500 configured for implementing wagering games according to the present disclosure utilizing a virtual dealer. The table 1500 may include player positions 1514 arranged in a bank about an arcuate edge 1520 of a video device 1558 that may comprise a card screen 1564 and a virtual dealer screen 1560. The dealer screen 1560 may display a video simulation of the dealer (i.e., a virtual dealer) for interacting with the video device 1558, such as through processing one or more stored programs stored in memory 1595 to implement the rules of game play at the video device 1558. The dealer screen 1560 may be carried by a generally vertically extending cabinet 1562 of the video device 1558. The substantially horizontal card screen 1564 may be configured to display at least one or more of the dealer's cards, any community cards, and each player's cards dealt by the virtual dealer on the dealer screen 1560.

Each of the player positions 1514 may include a player interface area 1532 configured for wagering and game play interactions with the video device 1558 and virtual dealer. Accordingly, game play may be accommodated without involving physical playing cards, poker chips, and live personnel. The action may instead be simulated by a control processor 1597 interacting with and controlling the video device 1558. The control processor 1597 may be programmed, by known techniques, to implement the rules of game play at the video device 1558. As such, the control processor 1597 may interact and communicate with display/input interfaces and data entry inputs for each player interface area 1532 of the video device 1558. Other embodiments of tables and gaming devices may include a control processor that may be similarly adapted to the specific configuration of its associated device.

A communication device 1599 may be included and operably coupled to the control processor 1597 such that information related to operation of the table 1500, information related to the game play, or combinations thereof may be communicated between the table 1500 and other devices, such as a central server, through a suitable communication medium, such, as, for example, wired networks, Wi-Fi networks, and cellular communication networks.

The video device 1558 may further include banners communicating rules of play and the like, which may be located along one or more walls 1570 of the cabinet 1562. The video device 1558 may further include additional decorative lights and speakers, which may be located on an underside surface 1566, for example, of a generally horizontally extending top 1568 of the cabinet 1562 of the video device 1558 generally extending toward the player positions 1514.

Although an embodiment is described showing individual discrete player stations, in some embodiments, the entire playing surface (e.g., player interface areas 1532, card screen 1564, etc.) may be a unitary electronic display that is logically partitioned to permit game play from a plurality of players for receiving inputs from, and displaying game information to, the players, the dealer, or both.

Figure 14:
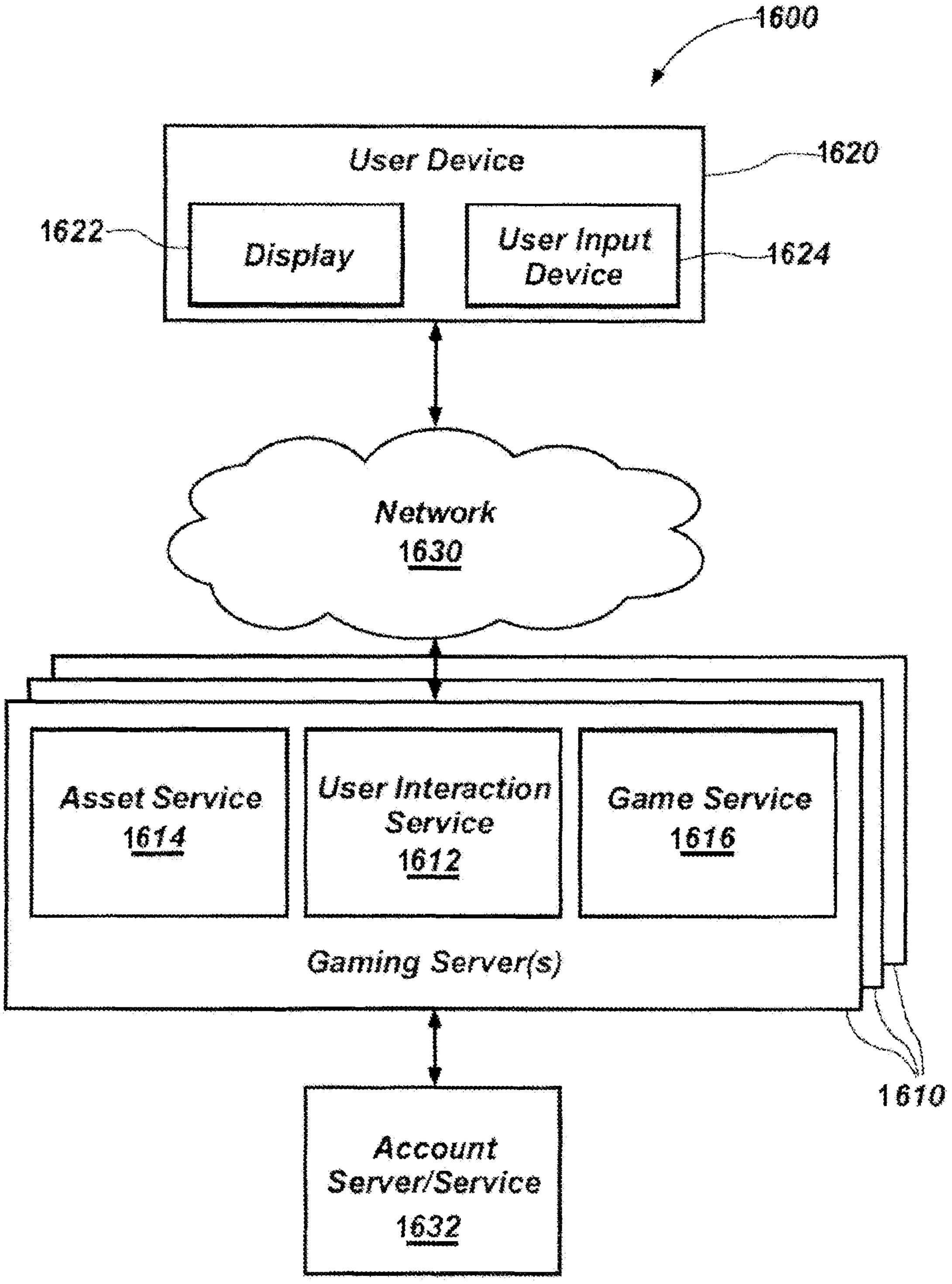
FIG. 14 is a schematic block diagram of a gaming system for implementing embodiments of wagering games in accordance with this disclosure.

In some embodiments, wagering games in accordance with this disclosure may be administered using a gaming system employing a client—server architecture (e.g., over the Internet, a local area network, etc.). FIG. 14 is a schematic block diagram of an illustrative gaming system 1600 for implementing wagering games according to this disclosure. The gaming system 1600 may enable end users to remotely access game content. Such game content may include, without limitation, various types of wagering games such as card games, dice games, big wheel games, roulette, scratch off games ("scratchers"), and any other wagering game where the game outcome is determined, in whole or in part, by one or more random events. This includes, but is not limited to, Class II and Class III games as defined under 25 U.S.C. § 2701 et seq. ("Indian Gaming Regulatory Act"). Such games may include banked and/or non-banked games.

The wagering games supported by the gaming system 1600 may be operated with real currency or with virtual credits or other virtual (e.g., electronic) value indicia. For example, the real currency option may be used with traditional casino and lottery-type wagering games in which money or other items of value are wagered and may be cashed out at the end of a game session. The virtual credits option may be used with wagering games in which credits (or other symbols) may be issued to a player to be used for the wagers. A player may be credited with credits in any way allowed, including, but not limited to, a player purchasing credits; being awarded credits as part of a contest or a win event in this or another game (including non-wagering games); being awarded credits as a reward for use of a product, casino, or other enterprise, time played in one session, or games played; or may be as simple as being awarded virtual credits upon logging in at a particular time or with a particular frequency, etc. Although credits may be won or lost, the ability of the player to cash out credits may be controlled or prevented. In one example, credits acquired (e.g., purchased or awarded) for use in a play-for-fun game may be limited to non-monetary redemption items, awards, or credits usable in the future or for another game or gaming session. The same credit redemption restrictions may be applied to some or all of credits won in a wagering game as well.

An additional variation includes web-based sites having both play-for-fun and wagering games, including issuance of free (non-monetary) credits usable to play the play-for-fun games. This feature may attract players to the site and to the games before they engage in wagering. In some embodiments, a limited number of free or promotional credits may be issued to entice players to play the games. Another method of issuing credits includes issuing free credits in exchange for identifying friends who may want to play. In another embodiment, additional credits may be issued after a period of time has elapsed to encourage the player to resume playing the game. The gaming system 1600 may enable players to buy additional game credits to allow the player to resume play. Objects of value may be awarded to play-for-fun players, which may or may not be in a direct exchange for credits. For example, a prize may be awarded or won for a highest scoring play-for-fun player during a defined time interval. All variations of credit redemption are contemplated, as desired by game designers and game hosts (the person or entity controlling the hosting systems).

The gaming system 1600 may include a gaming platform to establish a portal for an end user to access a wagering game hosted by one or more gaming servers 1610 over a network 1630. In some embodiments, games are accessed through a user interaction service 1612. The gaming system 1600 enables players to interact with a user device 1620 through a user input device 1624 and a display 1622 and to communicate with one or more gaming servers 1610 using a network 1630 (e.g., the Internet). Typically, the user device is remote from the gaming server 1610 and the network is the word-wide web (i.e., the Internet).

In some embodiments, the gaming servers 1610 may be configured as a single server to administer wagering games in combination with the user device 1620. In other embodiments, the gaming servers 1610 may be configured as separate servers for performing separate, dedicated functions associated with administering wagering games. Accordingly, the following description also discusses "services" with the understanding that the various services may be performed by different servers or combinations of servers in different embodiments. As shown in FIG. 14, the gaming servers 1610 may include a user interaction service 1612, a game service 1616, and an asset service 1614. In some embodiments, one or more of the gaming servers 1610 may communicate with an account server 1632 performing an account service 1632. As explained more fully below, for some wagering type games, the account service 1632 may be separate and operated by a different entity than the gaming servers 1610; however, in some embodiments the account service 1632 may also be operated by one or more of the gaming servers 1610.

The user device 1620 may communicate with the user interaction service 1612 through the network 1630. The user interaction service 1612 may communicate with the game service 1616 and provide game information to the user device 1620. In some embodiments, the game service 1616 may also include a game engine. The game engine may, for example, access, interpret, and apply game rules. In some embodiments, a single user device 1620 communicates with a game provided by the game service 1616, while other embodiments may include a plurality of user devices 1620 configured to communicate and provide end users with access to the same game provided by the game service 1616. In addition, a plurality of end users may be permitted to access a single user interaction service 1612, or a plurality of user interaction services 1612, to access the game service 1616. The user interaction service 1612 may enable a user to create and access a user account and interact with game service 1616. The user interaction service 1612 may enable users to initiate new games, join existing games, and interface with games being played by the user.

The user interaction service 1612 may also provide a client for execution on the user device 1620 for accessing the gaming servers 1610. The client provided by the gaming servers 1610 for execution on the user device 1620 may be any of a variety of implementations depending on the user device 1620 and method of communication with the gaming servers 1610. In one embodiment, the user device 1620 may connect to the gaming servers 1610 using a web browser, and the client may execute within a browser window or frame of the web browser. In another embodiment, the client may be a stand-alone executable on the user device 1620.

For example, the client may comprise a relatively small amount of script (e.g., JAVASCRIPT®), also referred to as a "script driver," including scripting language that controls an interface of the client. The script driver may include simple function calls requesting information from the gaming servers 1610. In other words, the script driver stored in the client may merely include calls to functions that are externally defined by, and executed by, the gaming servers 1610. As a result, the client may be characterized as a "thin client." The client may simply send requests to the gaming servers 1610 rather than performing logic itself. The client may receive player inputs, and the player inputs may be passed to the gaming servers 1610 for processing and executing the wagering game. In some embodiments, this may involve providing specific graphical display information for the display 1622 as well as game outcomes.

As another example, the client may comprise an executable file rather than a script. The client may do more local processing than does a script driver, such as calculating where to show what game symbols upon receiving a game outcome from the game service 1616 through user interaction service 1612. In some embodiments, portions of an asset service 1614 may be loaded onto the client and may be used by the client in processing and updating graphical displays. Some form of data protection, such as end-to-end encryption, may be used when data is transported over the network 1630. The network 1630 may be any network, such as, for example, the Internet or a local area network.

The gaming servers 1610 may include an asset service 1614, which may host various media assets (e.g., text, audio, video, and image files) to send to the user device 1620 for presenting the various wagering games to the end user. In other words, the assets presented to the end user may be stored separately from the user device 1620. For example, the user device 1620 requests the assets appropriate for the game played by the user; as another example, especially relating to thin clients, just those assets that are needed for a particular display event will be sent by the gaming servers 1610, including as few as one asset. The user device 1620 may call a function defined at the user interaction service 1612 or asset service 1614, which may determine which assets are to be delivered to the user device 1620 as well as how the assets are to be presented by the user device 1620 to the end user. Different assets may correspond to the various user devices 1620 and their clients that may have access to the game service 1616 and to different variations of wagering games.

The gaming servers 1610 may include the game service 1616, which may be programmed to administer wagering games and determine game play outcomes to provide to the user interaction service 1612 for transmission to the user device 1620. For example, the game service 1616 may include game rules for one or more wagering games, such that the game service 1616 controls some or all of the game flow for a selected wagering game as well as the determined game outcomes. The game service 1616 may include pay tables and other game logic. The game service 1616 may perform random number generation for determining random game elements of the wagering game. In one embodiment, the game service 1616 may be separated from the user interaction service 1612 by a firewall or other method of preventing unauthorized access to the game service 1612 by the general members of the network 1630.

The user device 1620 may present a gaming interface to the player and communicate the user interaction from the user input device 1624 to the gaming servers 1610. The user device 1620 may be any electronic system capable of displaying gaming information, receiving user input, and communicating the user input to the gaming servers 1610. For example, the user device 1620 may be a desktop computer, a laptop, a tablet computer, a set-top box, a mobile device (e.g., a smartphone), a kiosk, a terminal, or another computing device. As a specific, nonlimiting example, the user device 1620 operating the client may be an interactive electronic gaming system 1300. The client may be a specialized application or may be executed within a generalized application capable of interpreting instructions from an interactive gaming system, such as a web browser.

The client may interface with an end user through a web page or an application that runs on a device including, but not limited to, a smartphone, a tablet, or a general computer, or the client may be any other computer program configurable to access the gaming servers 1610. The client may be illustrated within a casino webpage (or other interface) indicating that the client is embedded into a webpage, which is supported by a web browser executing on the user device 1620.

In some embodiments, components of the gaming system 1600 may be operated by different entities. For example, the user device 1620 may be operated by a third party, such as a casino or an individual, that links to the gaming servers 1610, which may be operated, for example, by a wagering game service provider. Therefore, in some embodiments, the user device 1620 and client may be operated by a different administrator than the operator of the game service 1616. In other words, the user device 1620 may be part of a third-party system that does not administer or otherwise control the gaming servers 1610 or game service 1616. In other embodiments, the user interaction service 1612 and asset service 1614 may be operated by a third-party system. For example, a gaming entity (e.g., a casino) may operate the user interaction service 1612, user device 1620, or combination thereof to provide its customers access to game content managed by a different entity that may control the game service 1616, amongst other functionality. In still other embodiments, all functions may be operated by the same administrator. For example, a gaming entity (e.g., a casino) may elect to perform each of these functions in-house, such as providing access to the user device 1620, delivering the actual game content, and administering the gaming system 1600.

The gaming servers 1610 may communicate with one or more external account servers 1632 (also referred to herein as an account service 1632), optionally through another firewall. For example, the gaming servers 1610 may not directly accept wagers or issue payouts. That is, the gaming servers 1610 may facilitate online casino gaming but may not be part of self-contained online casino itself. Another entity (e.g., a casino or any account holder or financial system of record) may operate and maintain its external account service 1632 to accept bets and make payout distributions. The gaming servers 1610 may communicate with the account service 1632 to verify the existence of funds for wagering and to instruct the account service 1632 to execute debits and credits. As another example, the gaming servers 1610 may directly accept bets and make payout distributions, such as in the case where an administrator of the gaming servers 1610 operates as a casino.

Additional features may be supported by the gaming servers 1610, such as hacking and cheating detection, data storage and archival, metrics generation, messages generation, output formatting for different end user devices, as well as other features and operations.

Figure 15:
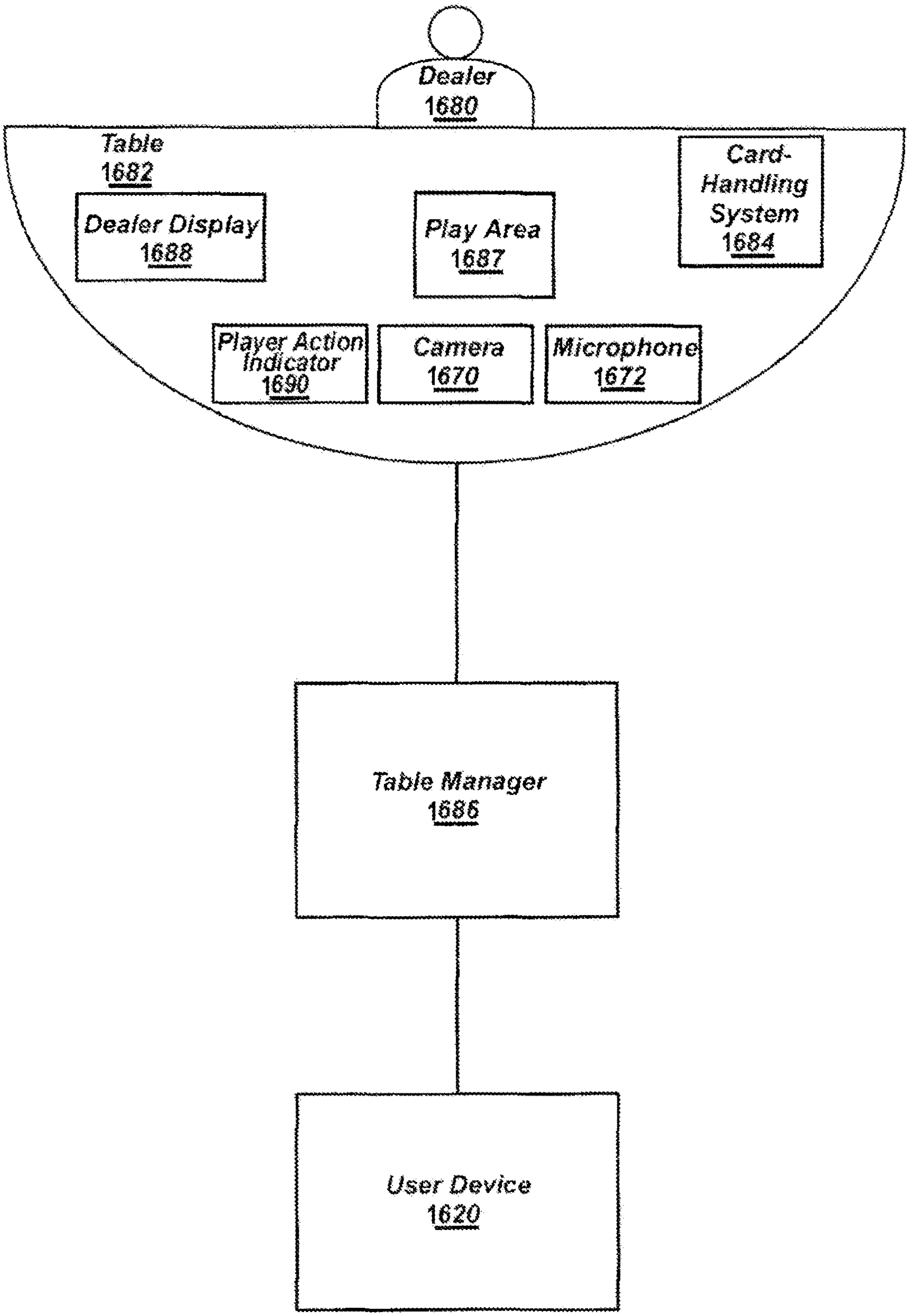
FIG. 15 is a schematic block diagram of a gaming system for implementing embodiments of wagering games including a live dealer feed.

FIG. 15 is a schematic block diagram of a table 1682 for implementing wagering games including a live dealer video feed. Features of the gaming system 1600 (see FIG. 14) described above in connection with FIG. 14 may be utilized in connection with this embodiment, except as further described. Rather than cards being determined by computerized random processes, physical cards (e.g., from a standard, 52-card deck of playing cards) may be dealt by a live dealer 1680 at a table 1682 from a card-handling system 1684 located in a studio or on a casino floor. A table manager 1686 may assist the dealer 1680 in facilitating play of the game by transmitting a live video feed of the dealer's actions to the user device 1620 and transmitting remote player elections to the dealer 1680. As described above, the table manager 1686 may act as or communicate with a gaming system 1600 (see FIG. 14) (e.g., acting as the gaming system 1600 (see FIG. 14) itself or as an intermediate client interposed between and operationally connected to the user device 1620 and the gaming system 1600 (see FIG. 14)) to provide gaming at the table 1682 to users of the gaming system 1600 (see FIG. 14). Thus, the table manager 1686 may communicate with the user device 1620 through a network 1630 (see FIG. 14), and may be a part of a larger online casino, or may be operated as a separate system facilitating game play. In various embodiments, each table 1682 may be managed by an individual table manager 1686 constituting a gaming device, which may receive and process information relating to that table. For simplicity of description, these functions are described as being performed by the table manager 1686, though certain functions may be performed by an intermediary gaming system 1600 (see FIG. 14), such as the one shown and described in connection with FIG. 14. In some embodiments, the gaming system 1600 (see FIG. 14) may match remotely located players to tables 1682 and facilitate transfer of information between user devices 1620 and tables 1682, such as wagering amounts and player option elections, without managing gameplay at individual tables. In other embodiments, functions of the table manager 1686 may be incorporated into a gaming system 1600 (see FIG. 14).

The table 1682 includes a camera 1670 and optionally a microphone 1672 to capture video and audio feeds relating to the table 1682. The camera 1670 may be trained on the live dealer 1680, play area 1687, and card-handling system 1684. As the game is administered by the live dealer 1680, the video feed captured by the camera 1670 may be shown to the player remotely using the user device 1620, and any audio captured by the microphone 1672 may be played to the player remotely using the user device 1620. In some embodiments, the user device 1620 may also include a camera, microphone, or both, which may also capture feeds to be shared with the dealer 1680 and other players. In some embodiments, the camera 1670 may be trained to capture images of the card faces, chips, and chip stacks on the surface of the gaming table. Known image extraction techniques may be used to obtain card count and card rank and suit information from the card images.

Card and wager data in some embodiments may be used by the table manager 1686 to determine game outcome. The data extracted from the camera 1670 may be used to confirm the card data obtained from the card-handling system 1684, to determine a player position that received a card, and for general security monitoring purposes, such as detecting player or dealer card switching, for example. Examples of card data include, for example, suit and rank information of a card, suit and rank information of each card in a hand, rank information of a hand, and rank information of every hand in a round of play.

The live video feed permits the dealer to show cards dealt by the card-handling system 1684 and play the game as though the player were at a gaming table, playing with other players in a live casino. In addition, the dealer can prompt a user by announcing a player's election is to be performed. In embodiments where a microphone 1672 is included, the dealer 1680 can verbally announce action or request an election by a player. In some embodiments, the user device 1620 also includes a camera or microphone, which also captures feeds to be shared with the dealer 1680 and other players.

The card-handling system 1684 may be as shown and was described previously. The play area 1686 depicts player layouts for playing the game. As determined by the rules of the game, the player at the user device 1620 may be presented options for responding to an event in the game using a client as described with reference to FIG. 14.

Player elections may be transmitted to the table manager 1686, which may display player elections to the dealer 1680 using a dealer display 1688 and player action indicator 1690 on the table 1682. For example, the dealer display 1688 may display information regarding where to deal the next card or which player position is responsible for the next action.

In some embodiments, the table manager 1686 may receive card information from the card-handling system 1684 to identify cards dealt by the card-handling system 1684. For example, the card-handling system 1684 may include a card reader to determine card information from the cards. The card information may include the rank and suit of each dealt card and hand information.

The table manager 1686 may apply game rules to the card information, along with the accepted player decisions, to determine gameplay events and wager results. Alternatively, the wager results may be determined by the dealer 1680 and input to the table manager 1686, which may be used to confirm automatically determined results by the gaming system.

Card and wager data in some embodiments may be used by the table manager 1686 to determine game outcome. The data extracted from the camera 1670 may be used to confirm the card data obtained from the card-handling system 1684, to determine a player position that received a card, and for general security monitoring purposes, such as detecting player or dealer card switching, for example.

The live video feed permits the dealer to show cards dealt by the card-handling system 1684 and play the game as though the player were at a live casino. In addition, the dealer can prompt a user by announcing a player's election is to be performed. In embodiments where a microphone 1672 is included, the dealer 1680 can verbally announce action or request an election by a player. In some embodiments, the user device 1620 also includes a camera or microphone, which also captures feeds to be shared with the dealer 1680 and other players.

Figure 16:
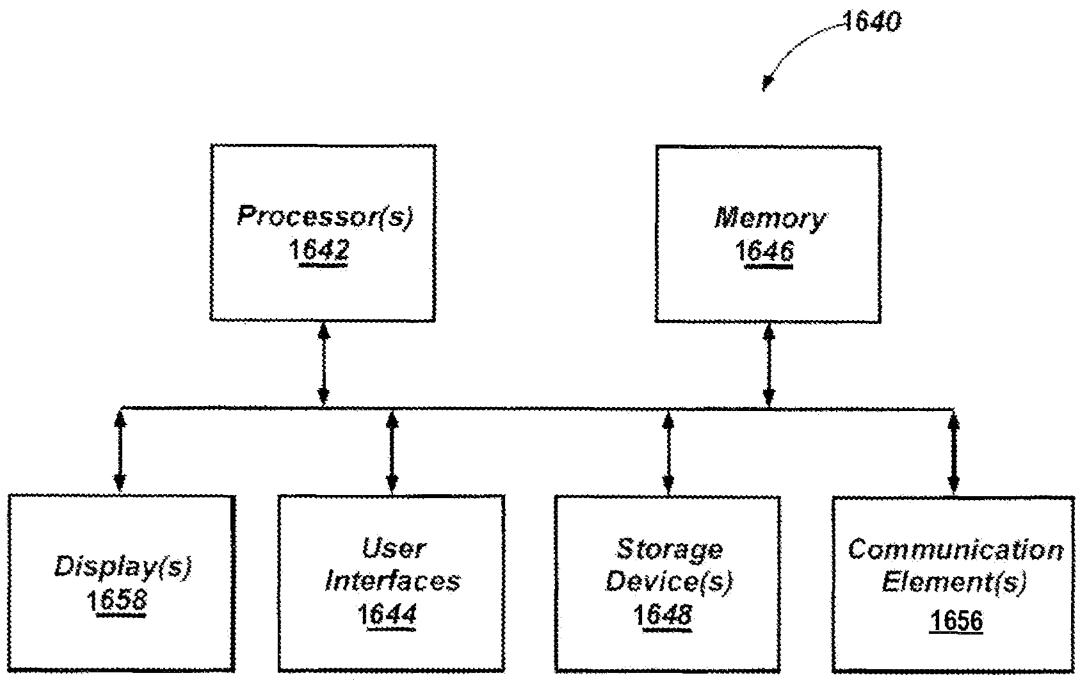
FIG. 16 is a block diagram of a computer for acting as a gaming system for implementing embodiments of wagering games in accordance with this disclosure.

FIG. 16 is a simplified block diagram showing elements of computing devices that may be used in systems and apparatuses of this disclosure. A computing system 1640 may be a user-type computer, a file server, a computer server, a notebook computer, a tablet, a handheld device, a mobile device, or other similar computer system for executing software. The computing system 1640 may be configured to execute software programs containing computing instructions and may include one or more processors 1642, memory 1646, one or more displays 1658, one or more user interface elements 1644, one or more communication elements 1656, and one or more storage devices 1648 (also referred to herein simply as storage 1648).

The processors 1642 may be configured to execute a wide variety of operating systems and applications including the computing instructions for administering wagering games of the present disclosure.

The processors 1642 may be configured as a general-purpose processor such as a microprocessor, but in the alternative, the general-purpose processor may be any processor, controller, microcontroller, or state machine suitable for carrying out processes of the present disclosure. The processor 1642 may also be implemented as a combination of computing devices, such as a combination of a DSP and a microprocessor, a plurality of microprocessors, one or more microprocessors in conjunction with a DSP core, or any other such configuration.

A general-purpose processor may be part of a general-purpose computer. However, when configured to execute instructions (e.g., software code) for carrying out embodiments of the present disclosure the general-purpose computer should be considered a special-purpose computer. Moreover, when configured according to embodiments of the present disclosure, such a special-purpose computer improves the function of a general-purpose computer because, absent the present disclosure, the general-purpose computer would not be able to carry out the processes of the present disclosure. The processes of the present disclosure, when carried out by the special-purpose computer, are processes that a human would not be able to perform in a reasonable amount of time due to the complexities of the data processing, decision making, communication, interactive nature, or combinations thereof for the present disclosure. The present disclosure also provides meaningful limitations in one or more particular technical environments that go beyond an abstract idea. For example, embodiments of the present disclosure provide improvements in the technical field related to the present disclosure.

The memory 1646 may be used to hold computing instructions, data, and other information for performing a wide variety of tasks including administering wagering games of the present disclosure. By way of example, and not limitation, the memory 1646 may include Synchronous Random Access Memory (SRAM), Dynamic RAM (DRAM), Read-Only Memory (ROM), Flash memory, and the like.

The display 1658 may be a wide variety of displays such as, for example, light-emitting diode displays, liquid crystal displays, cathode ray tubes, and the like. In addition, the display 1658 may be configured with a touch-screen feature for accepting user input as a user interface element 1644.

As nonlimiting examples, the user interface elements 1644 may include elements such as displays, keyboards, push-buttons, mice, joysticks, haptic devices, microphones, speakers, cameras, and touchscreens.

As nonlimiting examples, the communication elements 1656 may be configured for communicating with other devices or communication networks. As nonlimiting examples, the communication elements 1656 may include elements for communicating on wired and wireless communication media, such as for example, serial ports, parallel ports, Ethernet connections, universal serial bus (USB) connections, IEEE 1394 ("firewire") connections, THUNDERBOLT™ connections, BLUETOOTH® wireless networks, ZigBee wireless networks, 802.11 type wireless networks, cellular telephone/data networks, fiber optic networks and other suitable communication interfaces and protocols.

The storage 1648 may be used for storing relatively large amounts of nonvolatile information for use in the computing system 1640 and may be configured as one or more storage devices. By way of example and not limitation, these storage devices may include computer-readable media (CRM). This CRM may include, but is not limited to, magnetic and optical storage devices such as disk drives, magnetic tape, CDs (compact discs), DVDs (digital versatile discs or digital video discs), and semiconductor devices such as RAM, DRAM, ROM, EPROM, Flash memory, and other equivalent storage devices.

A person of ordinary skill in the art will recognize that the computing system 1640 may be configured in many different ways with different types of interconnecting buses between the various elements. Moreover, the various elements may be subdivided physically, functionally, or a combination thereof. As one nonlimiting example, the memory 1646 may be divided into cache memory, graphics memory, and main memory. Each of these memories may communicate directly or indirectly with the one or more processors 1642 on separate buses, partially combined buses, or a common bus.

As a specific, nonlimiting example, various methods and features of the present disclosure may be implemented in a mobile, remote, or mobile and remote environment over one or more of Internet, cellular communication (e.g., Broadband), near field communication networks and other communication networks referred to collectively herein as an iGaming environment. The iGaming environment may be accessed through social media environments such as FACEBOOK® and the like. DragonPlay Ltd, acquired by Bally Technologies Inc., provides an example of a platform to provide games to user devices, such as cellular telephones and other devices utilizing ANDROID®, iPHONE® and FACEBOOK® platforms. Where permitted by jurisdiction, the iGaming environment can include pay-to-play (P2P) gaming where a player, from their device, can make value based wagers and receive value based awards. Where P2P is not permitted the features can be expressed as entertainment only gaming where players wager virtual credits having no value or risk no wager whatsoever such as playing a promotion game or feature.

Figure 17:
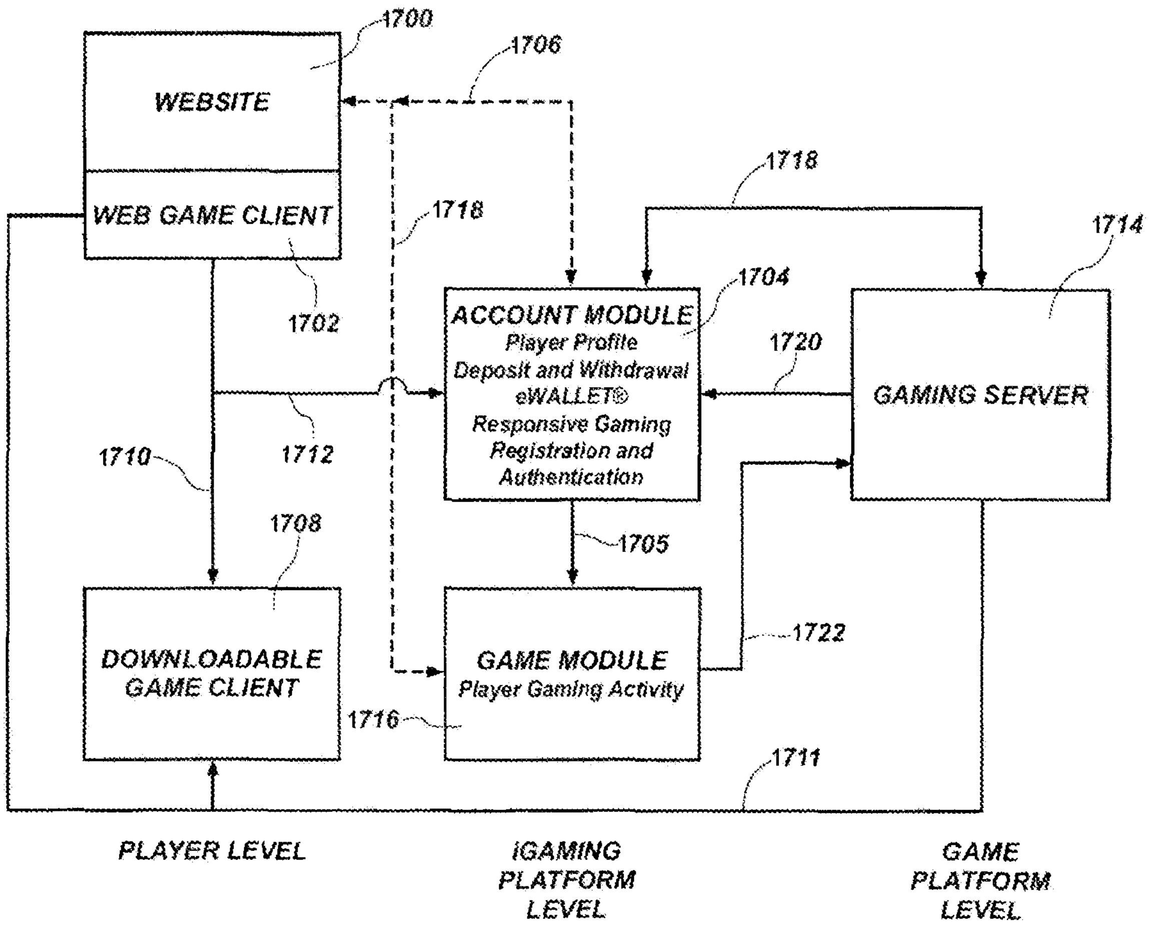
FIG. 17 illustrates an embodiment of data flows between various applications/services for supporting the game, feature or utility of the present disclosure for mobile/interactive gaming.

FIG. 17 illustrates an illustrative embodiment of information flows in an iGaming environment. At a player level, the player or user accesses a site hosting the activity such as a website 1700. The website 1700 may functionally provide a web game client 1702. The web game client 1702 may be, for example, represented by a game client 1708 downloadable at information flow 1710, which may process applets transmitted from a gaming server 1714 at information flow 1711 for rendering and processing game play at a player's remote device. Where the game is a P2P game, the gaming server 1714 may process value-based wagers (e.g., money wagers) and randomly generate an outcome for rendition at the player's device. In some embodiments, the web game client 1702 may access a local memory store to drive the graphic display at the player's device. In other embodiments, all or a portion of the game graphics may be streamed to the player's device with the web game client 1702 enabling player interaction and display of game features and outcomes at the player's device.

The website 1700 may access a player-centric, iGaming-platform-level account module 1704 at information flow 1706 for the player to establish and confirm credentials for play and, where permitted, access an account (e.g., an eWallet) for wagering. The account module 1704 may include or access data related to the player's profile (e.g., player-centric information desired to be retained and tracked by the host), the player's electronic account, deposit, and withdrawal records, registration and authentication information, such as username and password, name and address information, date of birth, a copy of a government issued identification document, such as a driver's license or passport, and biometric identification criteria, such as fingerprint or facial recognition data, and a responsible gaming module containing information, such as self-imposed or jurisdictionally imposed gaming restraints, such as loss limits, daily limits and duration limits. The account module 1704 may also contain and enforce geo-location limits, such as geographic areas where the player may play P2P games, user device IP address confirmation, and the like.

The account module 1704 communicates at information flow 1705 with a game module 1716 to complete log-ins, registrations, and other activities. The game module 1716 may also store or access a player's gaming history, such as player tracking and loyalty club account information. The game module 1716 may provide static web pages to the player's device from the game module 1716 through information flow 1718, whereas, as stated above, the live game content may be provided from the gaming server 1714 to the web game client through information flow 1711.

The gaming server 1714 may be configured to provide interaction between the game and the player, such as receiving wager information, game selection, inter-game player selections or choices to play a game to its conclusion, and the random selection of game outcomes and graphics packages, which, alone or in conjunction with the downloadable game client 1708/web game client 1702 and game module 1716, provide for the display of game graphics and player interactive interfaces. At information flow 1718, player account and log-in information may be provided to the gaming server 1714 from the account module 1704 to enable gaming. Information flow 1720 provides wager/credit information between the account module 1704 and gaming server 1714 for the play of the game and may display credits and eWallet availability. Information flow 1722 may provide player tracking information for the gaming server 1714 for tracking the player's play. The tracking of play may be used for purposes of providing loyalty rewards to a player, determining preferences, and the like.

All or portions of the features of FIG. 17 may be supported by servers and databases located remotely from a player's mobile device and may be hosted or sponsored by regulated gaming entity for P2P gaming or, where P2P is not permitted, for entertainment only play.

In some embodiments, wagering games may be administered in an at least partially player-pooled format, with payouts on pooled wagers being paid from a pot to players and losses on wagers being collected into the pot and eventually distributed to one or more players. Such player-pooled embodiments may include a player-pooled progressive embodiment, in which a pot is eventually distributed when a predetermined progressive-winning hand combination or composition is dealt. Player-pooled embodiments may also include a dividend refund embodiment, in which at least a portion of the pot is eventually distributed in the form of a refund distributed, e.g., pro-rata, to the players who contributed to the pot.

In some player-pooled embodiments, the game administrator may not obtain profits from chance-based events occurring in the wagering games that result in lost wagers. Instead, lost wagers may be redistributed back to the players. To profit from the wagering game, the game administrator may retain a commission, such as, for example, a player entrance fee or a rake taken on wagers, such that the amount obtained by the game administrator in exchange for hosting the wagering game is limited to the commission and is not based on the chance events occurring in the wagering game itself. The game administrator may also charge a rent of flat fee to participate.

It is noted that the methods described herein can be played with any number of standard decks of 52 cards (e.g., 1 deck to 10 decks). A standard deck is a collection of cards comprising an Ace, two, three, four, five, six, seven, eight, nine, ten, jack, queen, king, for each of four suits (comprising spades, diamonds, clubs, hearts) totaling 52 cards. Cards can be shuffled or a continuous shuffling machine (CSM) can be used. A standard deck of 52 cards can be used, as well as other kinds of decks, such as Spanish decks, decks with wild cards, etc. The operations described herein can be performed in any sensible order. Furthermore, numerous different variants of house rules can be applied.

Note that in the embodiments played using computers (a processor/processing unit), "virtual deck(s)" of cards are used instead of physical decks. A virtual deck is an electronic data structure used to represent a physical deck of cards which uses electronic representations for each respective card in the deck. In some embodiments, a virtual card is presented (e.g., displayed on an electronic output device using computer graphics, projected onto a surface of a physical table using a video projector, etc.) and is presented to mimic a real life image of that card.

Methods described herein can also be played on a physical table using physical cards and physical chips used to place wagers. Such physical chips can be directly redeemable for cash. When a player wins (dealer loses) the player's wager, the dealer will pay that player a respective payout amount. When a player loses (dealer wins) the player's wager, the dealer will take (collect) that wager from the player and typically place those chips in the dealer's chip rack. All rules, embodiments, features, etc. of a game being played can be communicated to the player (e.g., verbally or on a written rule card) before the game begins.

Initial cash deposits can be made into the electronic gaming machine which converts cash into electronic credits. Wagers can be placed in the form of electronic credits, which can be cashed out for real coins or a ticket (e.g., ticket-in-ticket-out) which can be redeemed at a casino cashier or kiosk for real cash and/or coins.

Any component of any embodiment described herein may include hardware, software, or any combination thereof.

Further, the operations described herein can be performed in any sensible order. Any operations not required for proper operation can be optional. Further, all methods described herein can also be stored as instructions on a computer readable storage medium, which instructions are operable by a computer processor. All variations and features described herein can be combined with any other features described herein without limitation. All features in all documents incorporated by reference herein can be combined with any feature(s) described herein, and also with all other features in all other documents incorporated by reference, without limitation.

Features of various embodiments of the inventive subject matter described herein, however essential to the example embodiments in which they are incorporated, do not limit the inventive subject matter as a whole, and any reference to the invention, its elements, operation, and application are not limiting as a whole, but serve only to define these example embodiments. This detailed description does not, therefore, limit embodiments which are defined only by the appended claims. Further, since numerous modifications and changes may readily occur to those skilled in the art, it is not desired to limit the inventive subject matter to the exact construction and operation illustrated and described, and accordingly all suitable modifications and equivalents may be resorted to, falling within the scope of the inventive subject matter.

What is claimed is:

1. A method comprising:

detecting, by a processor in response to analysis of image data by a neural network model, an appearance of one or more features of a gaming surface;

automatically modifying, by the processor via the neural network model in response to the detecting the appearance of the one or more features, a presentation attribute associated with presentation of gaming content via a designated area of the gaming surface; and projecting, by the processor via a projection system based on the modified presentation attribute, the gaming content onto the designated area of the gaming surface.

2. The method of claim 1, further comprising:

capturing the image data from an image-sensor perspective of an image sensor oriented at the gaming surface within a gaming environment, and wherein the analysis of the image data comprises, analyzing the appearance of the one or more features in the image data against a known geometry of the one or more features.

3. The method of claim 2, wherein the known geometry comprises an isomorphic equivalent to the appearance of the one or more features taken from a substantially equivalent image-sensor perspective oriented at the gaming surface during training of the neural network model in a training environment, and wherein the modifying is based on one or more transformations by the neural network model of the detected appearance of the one or more features to the isomorphic equivalent.

4. The method of claim 3, wherein the one or more transformations are based on one or more layout elements of the gaming surface specified in a layout authorized for presentation of wagering games via the designated area of the gaming surface.

5. The method of claim 1, wherein the gaming surface comprises a hard surface covered by a reflective material on which at least one of the one or more features is projected.

6. The method of claim 1, wherein the one or more features comprise features used for administration of a wagering game.

7. The method of claim 1, wherein the automatically modifying comprises:

detecting, by the processor based on the analysis of the image data by the neural network model, first relative positions between a first feature of the one or more features and a second feature of the one or more features;

searching, by the processor via the neural network model based on one or more transformations of the first relative positions, a library of layout templates;

selecting, by the processor via the neural network model based on the searching, a layout template from the library of layout templates, wherein the layout template has second relative positions between additional features on a gaming-surface layout, and wherein the second relative positions are isomorphic to the first relative positions; and wherein modifying the presentation attribute is based, at least in part, on dimensions of the additional features obtained from the layout template.

8. The method of claim 7, further comprising detecting, based on the analysis of the image data by the neural network model, a manufacturer of one or more of the gaming surface or the layout template, and wherein the searching comprises searching only a portion of the library of layout templates related to the detected manufacturer.

9. The method of claim 1, wherein the image data is captured via an image-sensor perspective of an image sensor affixed relative to the designated area, and wherein prior to automatically modifying the presentation attribute, said method further comprising:

obtaining additional image data taken of the gaming content projected onto the gaming surface using the presentation attribute for projection prior to being modified; and determining, based on isomorphic evaluation of the additional image data by the neural network model against the image data, a change in position of the one or more features relative to the designated area, wherein the automatically modifying the presentation attribute comprises automatically calibrating the presentation attribute based on the change in position.

10. The method of claim 1, wherein the automatically modifying the presentation attribute comprises one or more of:

self-calibrating a projector setting of the projection system; or modifying, based on analysis of the appearance of the one or more features by the neural network model, one or more of a position, a dimension, or an orientation of the gaming content within a virtual overlay of the gaming surface.

11. The method of claim 1, wherein the one or more features comprise at least one physical feature of the gaming surface and a grid of fiducial markers projected at the gamming surface via a projection perspective of the projection system, wherein each fiducial marker within the grid of fiducial markers has a unique appearance associated with specific coordinates of a grid structure, and wherein detecting the appearance of the one or more features comprises:

detecting, by the neural network model via the analysis of the image data, at least a portion of the grid of fiducial markers that are visible on the gaming surface; and determining, based on a detected orientation of the at least a portion of the grid of fiducial markers relative to known dimensions of the at least one physical feature, a homography matrix to automatically transform, based on the projection perspective and based on the specific coordinates of the grid structure, one or more dimensions of the gaming content to fit the designated area via the projecting.

12. A gaming system comprising:

a projection system; and a processor, wherein the processor is configured to execute instructions, which, when executed, cause the gaming system to perform operations to:

detect, in response to analysis of image data by a neural network model, an appearance of one or more features of a gaming surface;

automatically modify, via the neural network model in response to the detecting the appearance of the one or more features, a presentation attribute associated with presentation of gaming content via, a designated area of the gaming surface; and project, via the projection system based on the modified presentation attribute, the gaming content onto the designated area of the gaming surface.

13. The gaming system of claim 12, wherein the processor is further configured to execute instructions, which, when executed, cause the gaming system to perform operations to:

capture the image data from an image-sensor perspective of an image sensor oriented at the gaming surface within a gaming environment, and wherein the operation of analysis of the image data comprises operations to evaluate the appearance of the one or more features in the image data against a known geometry of the one or more features.

14. The gaming system of claim 13, wherein the known geometry comprises an isomorphic equivalent to the appearance of the one or more features taken from a substantially equivalent image-sensor perspective oriented at the gaming surface during training of the neural network model in a training environment, and wherein the operation to automatically modify the presentation attribute is based on one or more transformations by the neural network model of the detected appearance of the one or more features to the isomorphic equivalent.

15. The gaming system of claim 12, wherein the gaming surface comprises a hard surface covered by a reflective material on which at least one of the one or more features is projected.

16. The gaming system of claim 12, wherein the processor is further configured to execute instructions, which, when executed, cause the gaming system to perform operations to:

detect, based on the analysis of the image data by the neural network model, first relative positions between a first feature of the one or more features and a second feature of the one or more features;

search, via the neural network model based on one or more transformations of the first relative positions, a library of layout templates;

select, via the neural network model based on the searching, a layout template from the library of layout templates, wherein the layout template has second relative positions between additional features on a gaming-surface layout, and wherein the second relative positions are isomorphic to the first relative positions; and wherein modification of the presentation attribute is based, at least in part, on dimensions of the additional features obtained from the layout template.

17. The gaming system of claim 12, wherein the image data is captured via an image-sensor perspective of an image sensor affixed relative to the designated area, and wherein prior to automatic modification of the presentation attribute, said processor is further configured to execute instructions, which, when executed, cause the gaming system to perform operations to:

obtain additional image data taken of the gaming content projected onto the gaming surface using the presentation attribute for projection prior to being modified; and determine, based on isomorphic evaluation of the additional image data by the neural network model against the image data, a change in position of the one or more features relative to the designated area, wherein automatic modification of the presentation attribute comprises automatic calibration of the presentation attribute based on the change in position.

18. One or more non-transitory machine-readable media including instructions executable by a processor, the instructions including:

instructions for detecting, by a processor in response to analysis of image data by a neural network model, an appearance of one or more features of a gaming surface;

instructions for automatically modifying, via the neural network model in response to the detecting the appearance of the one or more features, a presentation attribute associated with presentation of gaming content via a designated area of the gaming surface; and instructions for projecting, via a projection system based on the modified presentation attribute, the gaming content onto the designated area of the gaming surface.

19. The one or more non-transitory machine-readable media of claim 18, wherein the instructions for automatically modifying the presentation attribute comprise one or more of:

instructions for self-calibrating a projector setting of the projection system; or instructions for modifying, based on analysis of the appearance of the one or more features by the neural network model, one or more of a position, a dimension, or an orientation of the gaming content within a virtual overlay of the gaming surface.

20. The one or more non-transitory machine-readable media of claim 18, wherein the one or more features comprise at least one physical feature of the gaming surface and a grid of fiducial markers projected at the gaming surface via a projection perspective of the projection system, wherein each fiducial marker within the grid of fiducial markers has a unique appearance associated with specific coordinates of a grid structure, and wherein the instructions for detecting the appearance of the one or more features comprise:

instructions for detecting, by the neural network model via the analysis of the image data, at least a portion of the grid of fiducial markers that are visible on the gaming surface; and instructions for determining, based on a detected orientation of the at least a portion of the grid of fiducial markers relative to known dimensions of the at least one physical feature, a homography matrix to automatically transform, based on the projection perspective and based on the specific coordinates of the grid structure, one or more dimensions of the gaming content to fit the designated area via the projecting.

* * * * *